(12) United States Patent
Nair

(10) Patent No.: US 12,461,891 B2
(45) Date of Patent: Nov. 4, 2025

(54) NEURAL NETWORK ACCELERATOR

(71) Applicant: SYNTHARA AG, Zug (CH)

(72) Inventor: Manu Vijayagopalan Nair, Dübendorf (CH)

(73) Assignee: SYNTHARA AG, Zug (CH)

( * ) Notice: Subject to any disclaimer, the term of this patent is extended or adjusted under 35 U.S.C. 154(b) by 48 days.

(21) Appl. No.: 18/573,964

(22) PCT Filed: Nov. 25, 2021

(86) PCT No.: PCT/IB2021/060991
§ 371 (c)(1),
(2) Date: Dec. 22, 2023

(87) PCT Pub. No.: WO2023/275610
PCT Pub. Date: Jan. 5, 2023

(65) Prior Publication Data
US 2024/0296142 A1    Sep. 5, 2024

(30) Foreign Application Priority Data

Jun. 28, 2021   (EP) ..................... 21182210

(51) Int. Cl.
*G06F 15/80* (2006.01)
*G06F 15/173* (2006.01)

(52) U.S. Cl.
CPC .... *G06F 15/8023* (2013.01); *G06F 15/17381* (2013.01); *G06F 15/803* (2013.01)

(58) Field of Classification Search
None
See application file for complete search history.

(56) References Cited

U.S. PATENT DOCUMENTS

| 5,212,773 | A | 5/1993 | Hillis | |
| 6,721,309 | B1* | 4/2004 | Stone | H04L 49/153 |
| | | | | 370/364 |
| 7,304,949 | B2* | 12/2007 | Gusat | H04L 49/103 |
| | | | | 370/230.1 |

(Continued)

OTHER PUBLICATIONS

International search report and written opinion of the International Searching Authority issued in connection with PCT/IB2021/060991.

*Primary Examiner* — Eric Coleman
(74) *Attorney, Agent, or Firm* — Gallium Law; Jacob Panangat; Michael Bakke

(57) ABSTRACT

A computing element array system includes an array of computing elements connected by connections. Each computing element has a control circuit, a storage circuit, and an operation circuit and the connections each connect two computing elements. The storage circuit can input and store a data packet comprising a data value and a target-tag from one of the connections. The operation circuit can perform an operation on the data value to form a processed data value. The target-tag specifies a computing element to perform the operation on the data value. The control circuit can identify a computing element from the target-tag, enable the operation circuit to process the data value if the identified computing element matches the computing element, modify the data packet to comprise the processed data value, and enable the output of the modified data packet on one of the connections.

17 Claims, 23 Drawing Sheets

(56) References Cited

U.S. PATENT DOCUMENTS

| | | | | |
|---|---|---|---|---|
| 7,788,468 B1* | 8/2010 | Nickolls | ............... | G06F 9/3834 |
| | | | | 712/22 |
| 2002/0154639 A1* | 10/2002 | Calvert | .................. | H04L 47/10 |
| | | | | 370/389 |
| 2003/0118054 A1* | 6/2003 | Zhu | ......................... | H04L 45/00 |
| | | | | 370/392 |
| 2010/0161938 A1* | 6/2010 | Heddes | ................... | G06F 15/16 |
| | | | | 712/E9.002 |
| 2015/0207905 A1* | 7/2015 | Merchant | ................ | H04L 45/74 |
| | | | | 370/392 |
| 2020/0285486 A1* | 9/2020 | Chritz | .................. | G06F 9/4494 |
| 2021/0073171 A1* | 3/2021 | Master | ................. | G06F 7/4876 |
| 2021/0266253 A1* | 8/2021 | He | ......................... | H04L 49/70 |

* cited by examiner

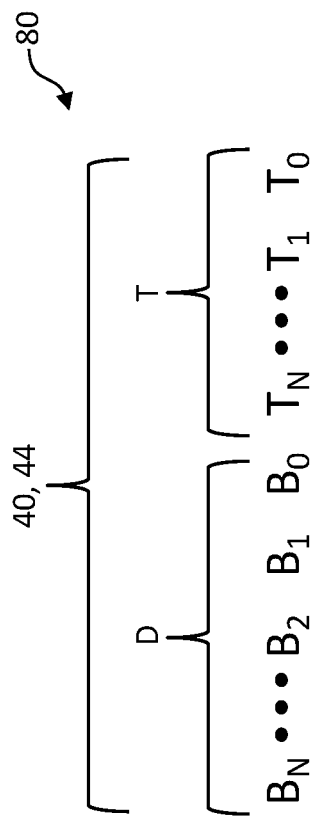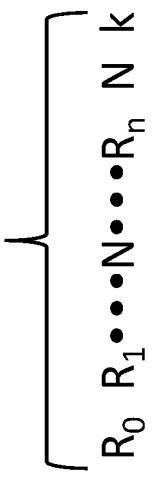
FIG. 8A
FIG. 8B
FIG. 8C

NEURAL NETWORK ACCELERATOR

TECHNICAL FIELD

The present disclosure relates generally to processing architectures, devices, and methods for artificial intelligence and, in particular, to artificial neural network hardware.

BACKGROUND

Sensor fusion is an important application for artificial intelligence systems. In such systems, a number of different sensors such as audio, camera, inertial and other sensor types are integrated on devices such as smart wearable devices, augmented reality headsets, drones, and in industrial and automotive applications. These sensors generate a variety of data that must be integrated (fused) into a common understanding and representation to address specific tasks. The data processing can have different complexities and require different data bandwidth. As the data from the different sensors changes over time, the processing and bandwidth requirements can change as well. Adapting to these changes for any of a variety of applications while keeping the energy consumption minimal is challenging and not well-addressed by current solutions.

Artificial neural networks have been proposed for many decades and, more recently, were further developed both as a software simulation within a conventional stored-program digital computer and as actual dedicated electronic hardware. Typical neural networks respond to a set of inputs with multiple layers of nodes with various strength interconnections. Both hardware and software neural networks can be adaptive and improve their results by changing interconnection strengths when supplied with data with a known-good output, e.g., by training.

Modern neural networks can be very large and can require large amounts of power. In some applications, real-time processing is necessary to provide useful output in useful amounts of time, especially for safety-critical tasks. Moreover, applications in portable devices have only limited power available. There is a need therefore, for neural networks that provide efficient, timely processing with reduced power and hardware needs.

SUMMARY

Embodiments of the present disclosure can provide, inter alia, neural networks that operate with reduced power and bandwidth. Some embodiments comprise a neural network accelerator (e.g., a hardware circuit) designed for dynamic neural network processing workloads. The neural network can be a fixed hardware electronic system or can comprise a state machine whose operation can be reconfigured using variable parameters stored in the hardware, for example specified with firmware or other software means.

Embodiments of the present disclosure comprise a real-time computing system; the real-time computing system can be a pattern-matching, machine learning, neural network, or artificial intelligence system. The real-time computing system can be a neural network accelerator. According to embodiments of the present disclosure, the real-time computing system comprises a hardware system that continuously monitors variable inputs, for example sensor inputs, and produces a monitor signal in response to the variable inputs, for example an interrupt signal. Sensor inputs can comprise single values, vectors, or arrays of values such as images.

The hardware system can be an electronic or opto-electronic computing system. The operation of the hardware system can be fixed or can be reconfigured by stored parameters or firmware, for example by storing variable values in the hardware that can control and modify the operation of the hardware or provide variables in hardware calculations or other software means. Embodiments of the present disclosure can provide a hardware system that comprises an array of in-memory matrix multipliers, each a computing element. Each computing element comprises an array of computing elements connected by connections, wherein each computing element comprises a control circuit, a storage circuit, and an operation circuit.

According to embodiments of the present disclosure, a computing element array system comprises an array of computing elements connected by connections. Each computing element comprises a control circuit, a storage circuit, and an operation circuit. The connections each connect two computing elements. For each computing element in the array of computing elements the storage circuit is operable to input a data packet comprising a data value and a target-tag from one of the connections and to store the data packet, the operation circuit is operable to perform an operation on the data value to form a processed data value, the target-tag specifies a computing element to perform the operation on the data value, and the control circuit is operable to identify the computing element with the computing element specified by the target-tag, enable the operation circuit to process the data value if the computing element identified by the target-tag is the computing element, modify the data packet to comprise the processed data value, and enable the output of the modified data packet on one of the connections.

The target-tag can comprise one or more routing values disposed in a routing value ordered list. The control circuit can be operable to modify the routing values in the routing value ordered list. The control circuit can be operable to remove a routing value from the routing value ordered list. The routing value ordered list can comprise a routing value list pointer and the control circuit is operable to change the routing value list pointer. One or more of the routing values can be a no-route value specifying the computing element and the control circuit identifies the computing element with the no-route value. In some embodiments, a routing value list that is a null-set (an empty list) is equivalent to a no-route value. The computing element can comprise a self-tag describing the computing element. The target-tag can comprise one or more computing element specifications. The computing element specifications can be disposed in a computing element ordered list. The computing element specifications can be an identification of the computing element or an identification of the function of the computing element, for example the operation or computation of the computing element. The control circuit can identify the computing element by comparing the computing element specification in the target-tag with the self-tag. The control circuit can be operable to modify the computing elements in the computing element ordered list. The control circuit can be operable to remove a computing element from the computing element ordered list. The computing element ordered list can comprise a computing element list pointer and the control circuit can be operable to change the computing element list pointer. The control circuit can be operable to modify the target-tag to provide an end-tag to the computing element ordered list. The target-tag can specify multiple computing elements to sequentially perform operations on the data value.

The array can be a two-dimensional grid, a two-dimensional array, a torus, a ring, a three-dimensional grid, or a three-dimensional array.

According to embodiments of the present disclosure, the computing element array system comprises a data control circuit connected to one or more computing elements in the array of computing elements. The data control circuit can be operable to receive data packets from outside the array of computing elements and transmit data packets out of the array of computing elements. The data control circuit can be connected to one or more computing elements in the array of computing elements through a connection. The data control circuit can be connected to one or more computing elements in the array of computing elements through a bus. The data control circuit can be operable to receive a data packet from the array of computing elements and return the data packet to the array of computing elements. The data control circuit can be connected to one or more computing elements in the array of computing elements.

According to some embodiments of the present disclosure, the data packet received by the data control circuit from a computing element in the array comprises an end-tag or a no-route value and the data control circuit is operable to transmit the data value out of the computing element array in response to the end-tag or no-route value. According to some embodiments of the present disclosure, the target-tag of a data packet received by the data control circuit from a computing element in the array does not comprise an end-tag or a no-route value and the data control circuit is operable to transmit the data value into a computing element in the array.

According to some embodiments, the connections are bidirectional connections. According to some embodiments, the connections are uni-directional connections. According to embodiments, one or more of the computing elements is connected by connections to two, three, four, or eight neighboring computing elements. According to some embodiments, the storage circuit of one or more of the computing elements is operable to receive input data from one, two, three, four, or eight neighboring computing elements, is operable to output data to one, two, three, four, or eight neighboring computing elements, or both.

According to some embodiments, the operation circuit is operable to (i) calculate a matrix-vector product operation, (ii) calculate an addition, (iii) calculate an accumulation, (iv) calculate a multiplication, (v) calculate a transformation, (vi) perform a filter operation, (vii) perform a table look-up, or (viii) any combination of (i)-(vii). According to some embodiments of the present disclosure, one or more of the computing elements is configurable. According to some embodiments of the present disclosure, one or more of the computing elements is operable to store one or more configuration variables. According to some embodiments of the present disclosure, one or more of the configuration variables comprises a self-tag, a calculation constant, or an operation configuration.

According to some embodiments of the present disclosure, the computing element is (i) a routing node, (ii) a memory node, (iii) operable to perform a routing pass-through, (iv) operable to store one or more data values for a specified period, or (v) any combination of (i)-(iv).

According to some embodiments of the present disclosure, the operation circuit of a first computing element is operable to perform a first operation and the operation circuit of a second computing element is operable to perform a second operation different from the first operation. The operation circuit of one of the computing elements can be operable to perform two or more operations. The control circuit can be operable to select an operation responsive to a configuration variable.

According to some embodiments of the present disclosure, the control circuit is operable to select an operation responsive to the target-tag or a routing value.

According to some embodiments of the present disclosure, two or more of the computing elements are synchronous or two or more of the computing elements are asynchronous, or both.

Each one of the computing elements can be directly or indirectly connected to a configuration control circuit, for example though a serial or parallel bus or a daisy-chain connection.

The target-tag can specify a mathematical function or a compute graph.

According to embodiments of the present disclosure, a computing element array comprises an array of computing elements connected by connections, wherein each computing element comprises a control circuit, a storage circuit, and an operation circuit, and each computing element is operable to store a self-tag that identifies an operation performed by the operation circuit. For each computing element in the array of computing elements, the storage circuit can be operable to receive a data packet from one of the connections and store the input data, the data packet can comprise a data value and a target-tag specifying an operation to be performed on the data value, the control circuit can be operable to compare the target-tag to the self-tag, enable the operation circuit to process the data value if the self-tag matches the target-tag, modify the data packet to comprise the processed data value, and enable the output of the modified data packet on one of the connections, and the operation circuit can be operable to process the data value to form a processed data value. The target-tag can comprise one or more routing values disposed in a routing value ordered list. The control circuit can be operable to modify the routing values in the routing value ordered list. The control circuit can be operable to remove a routing value from the routing value ordered list. The routing value ordered list can comprise a routing value list pointer and the control circuit is operable to change the routing value list pointer.

According to embodiments of the present disclosure, a computing element array comprises an array of computing elements connected by connections, wherein each computing element comprises a control circuit, a storage circuit, and an operation circuit. For each computing element in the array of computing elements, the storage circuit can be operable to receive a data packet from one of the connections and store the data packet. The data packet can comprise a data value and a target-tag specifying routing values, wherein one of the routing values is a no-route value indicating that the operation circuit operates on the data value, the control circuit can be operable to identify the no-route value, enable the operation circuit to process the data value if the no-route value is identified, modify the data packet to comprise the processed data value, and enable the output of the modified data packet on one of the connections, and the operation circuit can be operable to process the data value to form a processed data value. The target-tag can comprise one or more routing values disposed in a routing value ordered list. The control circuit can be operable to modify the routing values in the routing value ordered list. The control circuit can be operable to remove a routing value from the routing value ordered list. The routing value ordered list can comprise a routing value list pointer and the control circuit is operable to change the routing value list pointer.

According to embodiments of the present disclosure, a matrix-vector multiplier comprises an array of unit multipliers. Each unit multiplier can comprise a latch storing a stored value, a capacitor, and a switch responsive to a switch input to conduct a charge from the latch to the capacitor. The capacitors of the unit multipliers are electrically connected in parallel to provide an output charge value. The stored value can be an analog value, the switch input can be an analog input, and the unit capacitive multiplier can be an analog multiplier. According to some embodiments, the stored value is a digital value, the switch input is a digital input, and the unit multiplier is a digital multiplier. According to some embodiments, the switch input is a digital value and embodiments comprise a digital-to-analog converter connected to the switch to convert the switch input to an analog value. According to some embodiments, the output value is an analog charge value and embodiments comprise an analog-to-digital converter connected to the analog charge value to convert the analog charge value to an output digital value. The switch can be a bipolar transistor, the latch can comprise a capacitor, or both.

Embodiments of the present disclosure can comprise a transform circuit connected to the switch input, the latch, the capacitors, or any combination of the switch input, the latch, and the capacitors.

According to embodiments of the present disclosure, a matrix-vector multiplier comprises an array of digital unit multipliers. Each digital unit multiplier can comprise a latch storing a stored value, a resistor, and an array of switches responsive to a switch input to multiply the stored value by the switch input to provide bit values. A bit adder can add the bit values to form a product of the stored value and the switch input. The bit adder can be a digital logic circuit.

According to embodiments of the present disclosure, a matrix-vector multiplier comprises a vector input circuit providing N digital input values, an M×N array of stored digital weight values stored in N rows of M columns, an M×N array of multipliers, wherein the array of multipliers is operable to multiply each column of N stored digital weight values by the N digital input value to produce N products for each column M, and an accumulator operable to accumulate the digital values of the N products of each column M and provide M accumulation values. The N digital input values can each comprise i bits, the stored digital weight values can each comprise j bits, and each multiplier computes a product of fewer than i+j bits.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which:

FIGS. 8A-8C are illustrations of bits in a data packet according to illustrative embodiments of the present disclosure;

Figure 1:
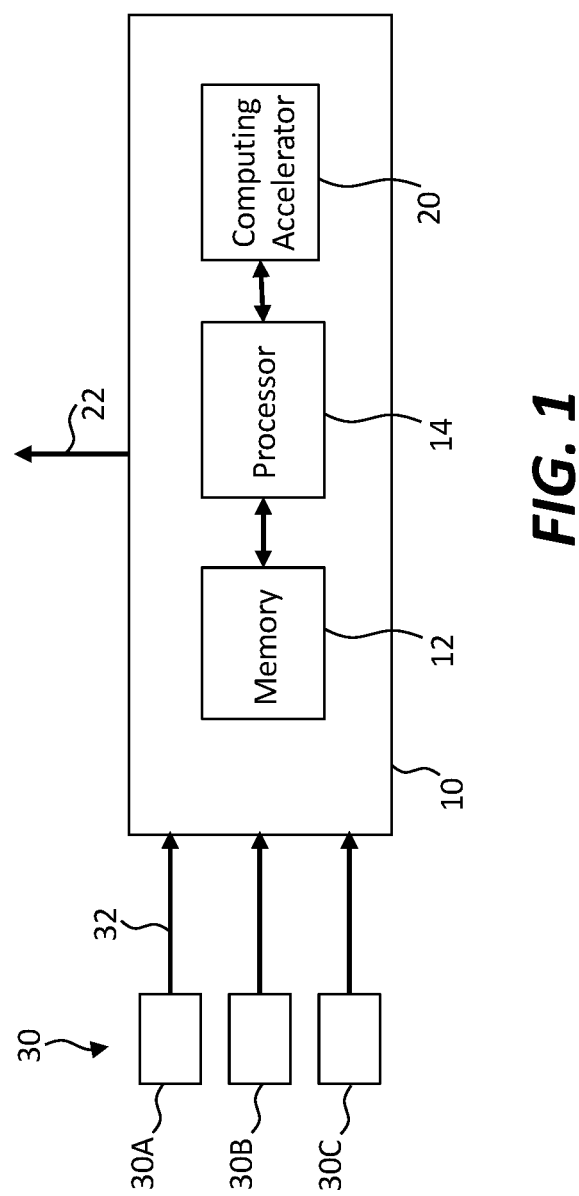
FIG. 1 is a schematic of a real-time computing system comprising sensors and a hardware unit comprising a computing accelerator according to illustrative embodiments of the present disclosure.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not necessarily drawn to scale.

DETAILED DESCRIPTION OF CERTAIN EMBODIMENTS

Certain embodiments of the present disclosure are directed toward neural networks, pattern-matching computers, or machine-learning computers that provide efficient and timely processing with reduced power and hardware requirements. Such embodiments can comprise a computing accelerator, e.g., a neural network accelerator, a pattern-matching accelerator, a machine learning accelerator, or an artificial intelligence computation accelerator designed for static or dynamic processing workloads, for example, but not limited to, sensor fusion. Dynamic workloads can, in some embodiments, comprise at least two categories of tasks: always-on tasks that require continuous temporal monitoring and interrupt-driven tasks that occur at specific times. In some cases, the always-on tasks are relatively less computationally intensive, and interrupt driven tasks are relatively more computationally intensive. Examples of always-on tasks can include (but are not limited to) the continuous classification of temporal signals from one or more sensors, e.g., biomedical sensors, motion sensors such as accelerometers, and audio sensors such as microphones, to provide motion detection and classification and key phrase detection. Examples of interrupt-driven tasks can include (but are not limited to) image segmentation, speech translation, and object detection and identification. Processed always-on tasks can monitor a continuous stream of input (e.g., sensor) data to detect a trigger event and provide a trigger signal (e.g., an interrupt) in response to the trigger event for an interrupt-driven task processed by a separate hardware or software system. Systems of the present disclosure can be computational accelerators connected to conventional computer system or supercomputers, for example through conventional protocol or hardware interfaces, either serial or parallel.

Embodiments of the present disclosure illustrated in FIG. 1 comprise hardware systems 10 comprising a computing accelerator 20 that provides energy-efficient computation in response to always-on, continuous, or continuously sampled signals, for example from sensors 30 that provide sensor signals 32. Hardware system 10 can respond to sensor signals 32 from sensors 30 and can comprise a microcontroller or computer (e.g., comprising a memory 12 and processor 14) in communication with computing accelerator 20. According to some embodiments, hardware system 10 can consume only microWatts of power when detecting trigger events to provide a trigger interrupt signal 22. According to embodiments of the present disclosure, computing accelerator 20 can process data sets (e.g., compute or calculate results by mathematically processing data values in a data set) faster and with less power than a conventional stored-program digital computer (e.g., a computer comprising a software program stored in a memory (e.g., memory 12) that drives a central processing unit (e.g., processor 14)). According to embodiments, computing accelerator 20 can be a hardware accelerator. The hardware accelerator operation can be configurable, e.g., with firmware or configuration variables. According to embodiments, computing accelerator 20 can compute neural network and machine learning tasks that are conventionally dominated by matrix-vector product operations more efficiently and with fewer central processing unit-memory interactions or data transfers. Computing accelerator 20 can provide a useful combination of computing speed and adaptability to a variety of computing tasks or functions.

Computing accelerator 20 can comprise an in-memory processing architecture that eliminates or reduces data transfer between a processor 14 (e.g., central processing unit or cpu) and a memory 12, such as those found in a conventional stored-program digital computer, to perform matrix-vector product operations. Since the power use of such a conventional system is dominated by memory-cpu data transfer, the elimination or reduction of such data transfers greatly reduces the power usage of hardware system 10. Hardware system 10 and computing accelerator 20 can be implemented in one or more application specific integrated circuits (ASICs), can operate in real-time in response to sensors 30 input, and can support a direct interface to unprocessed analog data from sensors 30 (e.g., different sensors 30A, 30B, 30C).

Figure 2:
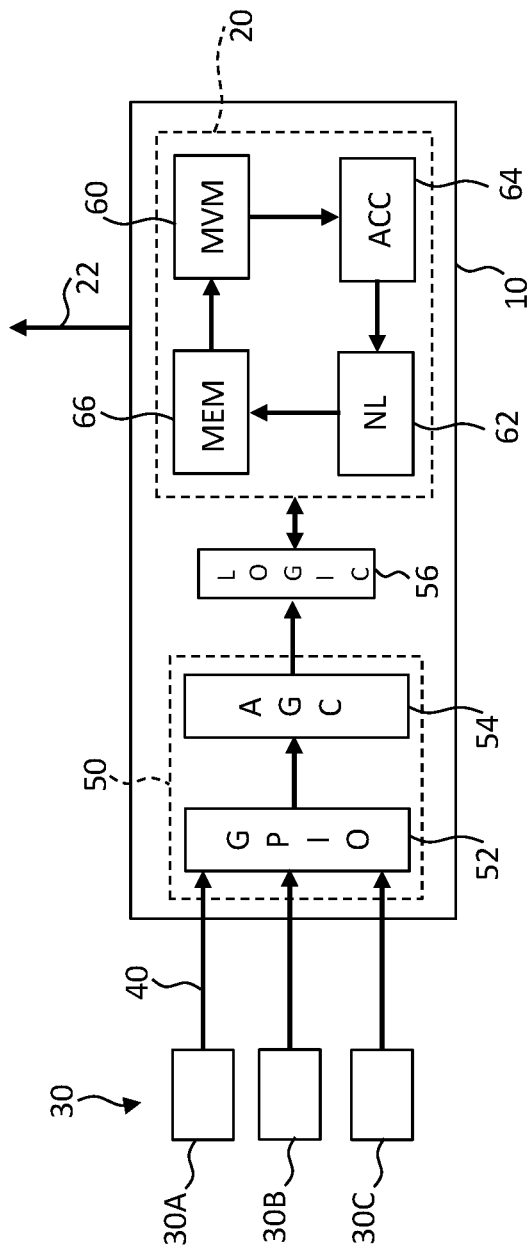
FIG. 2 is a functional schematic of a computing accelerator according to illustrative embodiments of the present disclosure.

According to embodiments of the present disclosure and as illustrated in FIGS. 1 and 2, hardware system 10 can comprise an array of in-memory matrix multipliers (e.g., an array of computing elements 70), can operate at sub-mW energy levels, and can synchronously or asynchronously process incoming data. FIG. 2 is a functional illustration of hardware system 10 and computing accelerator 20 operations rather than a circuit representation. Computing accelerator 20 can comprise in-memory matrix multipliers (MVMs) 60, non-linearity transformers (NLs) 62, accumulator blocks (ACCs) 64, and one or more memory nodes (MEMs) 66. Hardware system 10 can comprise internal leakage, control, and clock gating logic 56, interfacing circuits for sensors 30, a sensor interface circuit 50, for example comprising analog general-purpose input/output circuits (GPIOs) 52, and automatic gain control (AGC) circuits 54 electrically connected to analog sensors 30. Hardware system 10 and computing accelerator 20 can support low-pass RNNs (recurrent neural networks), fully connected neural network layers, gated RNNs such as long/short-term memory networks (LSTM) or gated recurrent units, and one-dimensional connected neural networks (1D-CNN).

According to embodiments of the present disclosure, matrix-vector product calculations are based on an in-memory computation module and architecture that efficiently performs the calculations with a reduced number of data transfers and, consequently, reduced power. This reduction is on the order of $n^2$ where n is the number of elements in the matrix. Embodiments of the present disclosure have been modeled and simulations indicate that arrays of computing elements 70 can operate at no less than 1 Top/s/W (Tera Operations/second/Watt) (e.g., at no less than 4 Top/s/W, at no less than 10 Top/s/W, at no less than 20 Top/s/W, at no less than 50 Top/s/W, or at no less than 100 Top/s/W). Some embodiments of the present disclosure provide 4 to 100 Top/s/W. Some embodiments of the present disclosure provide no less than 50, 100, or 150 GOps/s.

Figure 3:
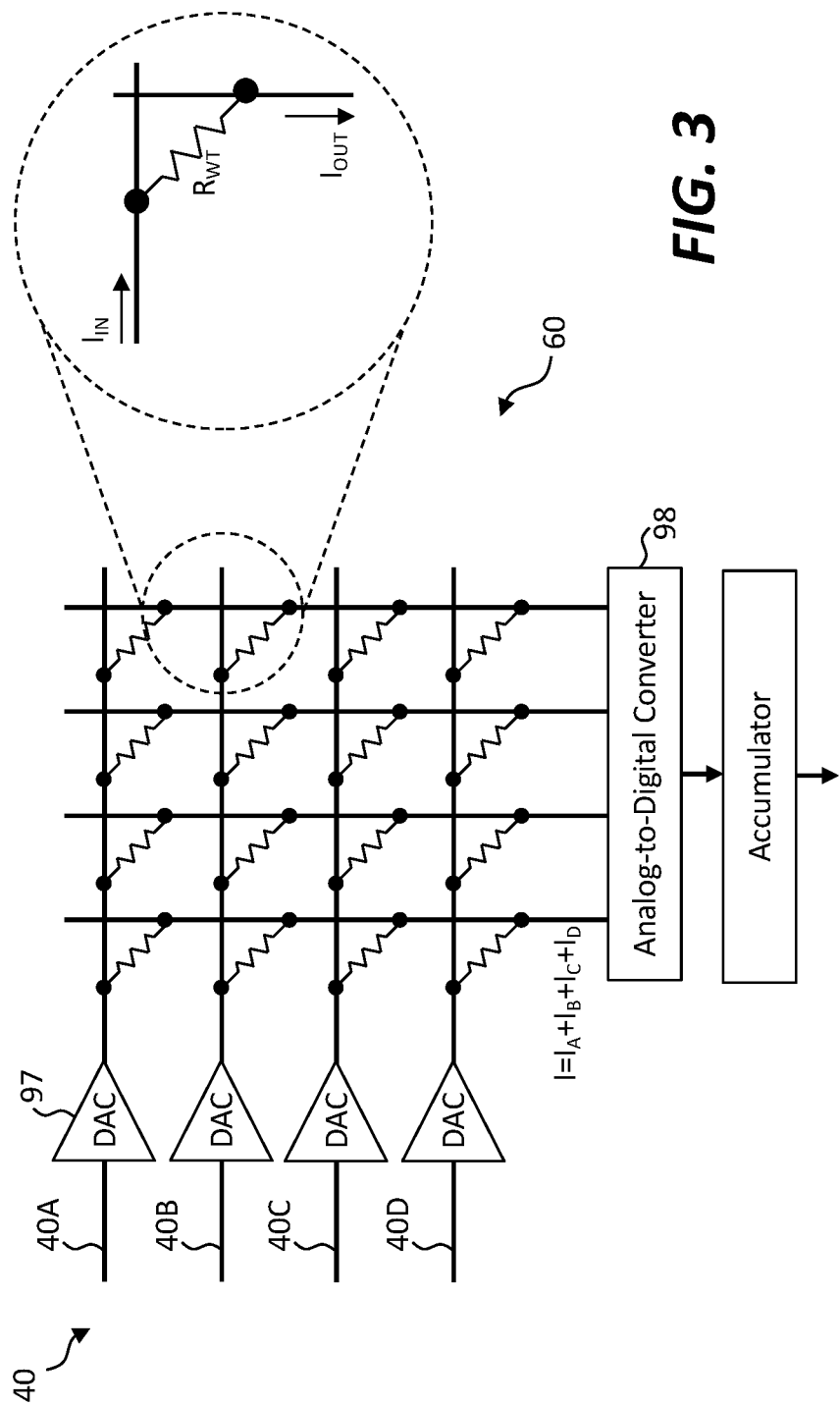
FIG. 3 is a schematic of a matrix-vector product circuit according to illustrative embodiments of the present disclosure.

FIG. 3 illustrates an analog, current-based implementation of a vector-matrix multiplication circuit. Each input line on the left carries a separate input data 40 value with a separate current (at a given voltage). Each output line across the bottom of the matrix is a sum of the input currents $I_{IN}$ provided from each input line through a resistor $R_{WT}$ connecting the input line to the output line. Resistor $R_{WT}$ provides a weight value associated with each input line to provide the vector multiplication so that the output current $I_{OUT}=V/R_{WT}$. The summed currents $I_{OUT}$ on each output line provide an output vector that is then accumulated (added or summed) to provide a final, weighted output value. The input, output, and accumulation can be analog or, as shown in FIG. 3, digital with corresponding digital-to-analog converters 97 and analog-to-digital converters 98.

Any hardware implementation of a vector-matrix circuit must be sized to efficiently accommodate the sizes of the input vectors. If the vector-matrix circuit is too large, much of the circuit is not used (e.g., the input currents $I_{IN}$ on some of the input lines are zero, or the corresponding $R_{WT}$ are zero, or both). If the vector-matrix circuit is too small, the vector multiplication must be broken down into smaller vectors; too many small vectors likewise lead to inefficiency. Non-linearity conversions (transformations) can be applied to the accumulated values and between matrix-vector product operations to better model the neuronal operation of the circuit.

Figure 4:
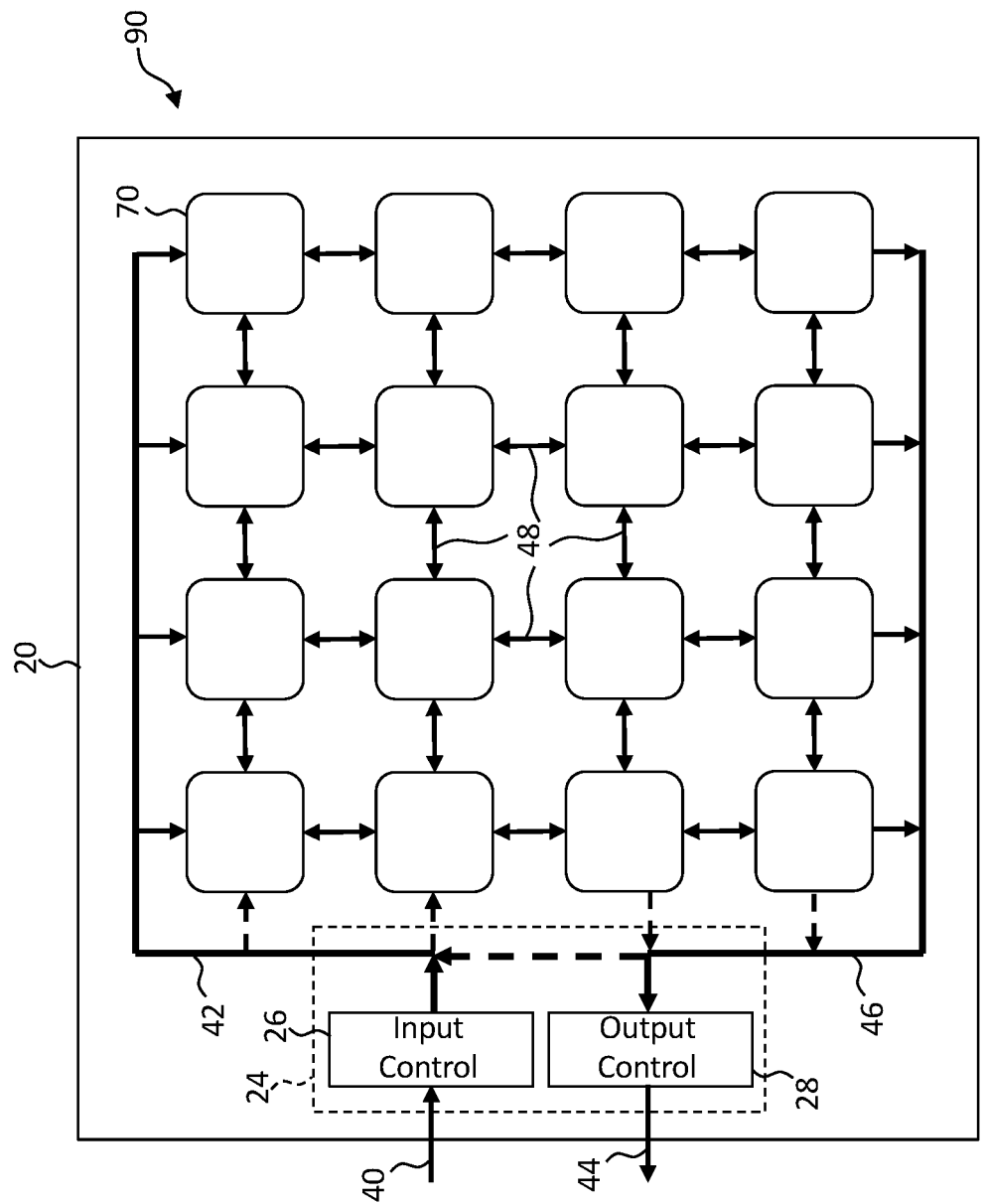
FIG. 4 is a schematic of a grid-connected computing accelerator comprising an array of computing elements according to illustrative embodiments of the present disclosure.
Figure 5B:
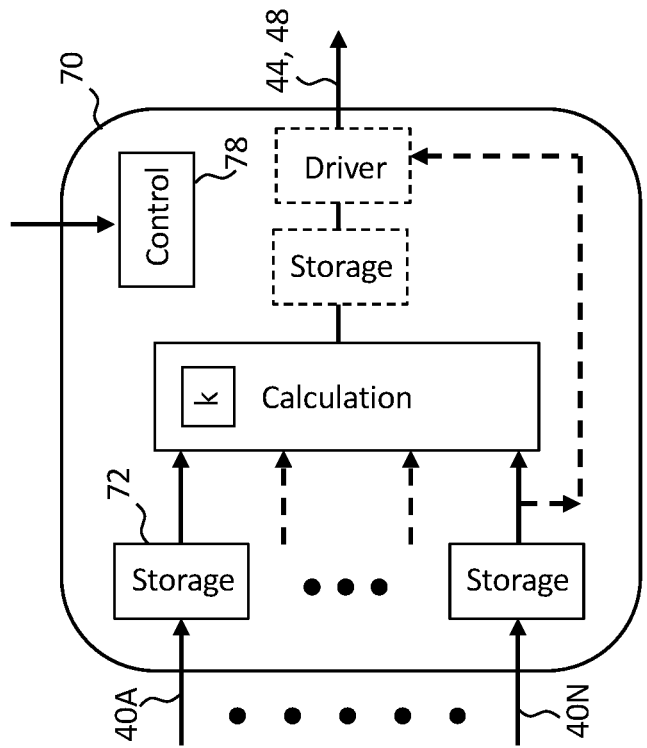
FIGS. 5A and 5B are schematics of computing elements according to illustrative embodiments of the present disclosure.
Figure 5A:
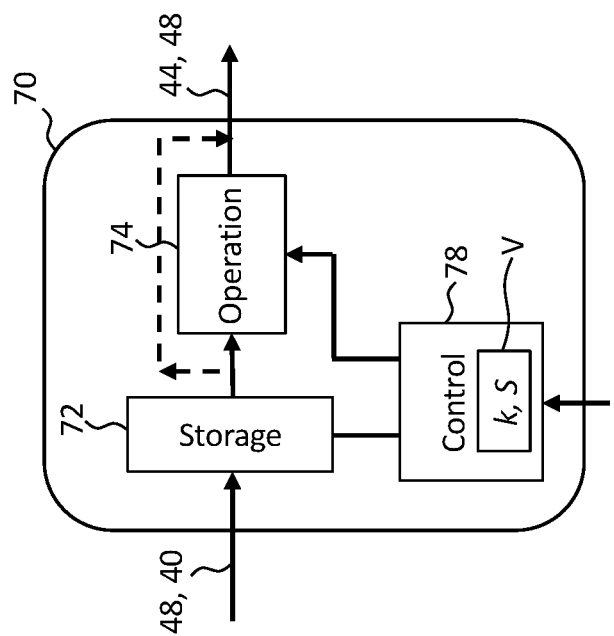
Figure 6B:
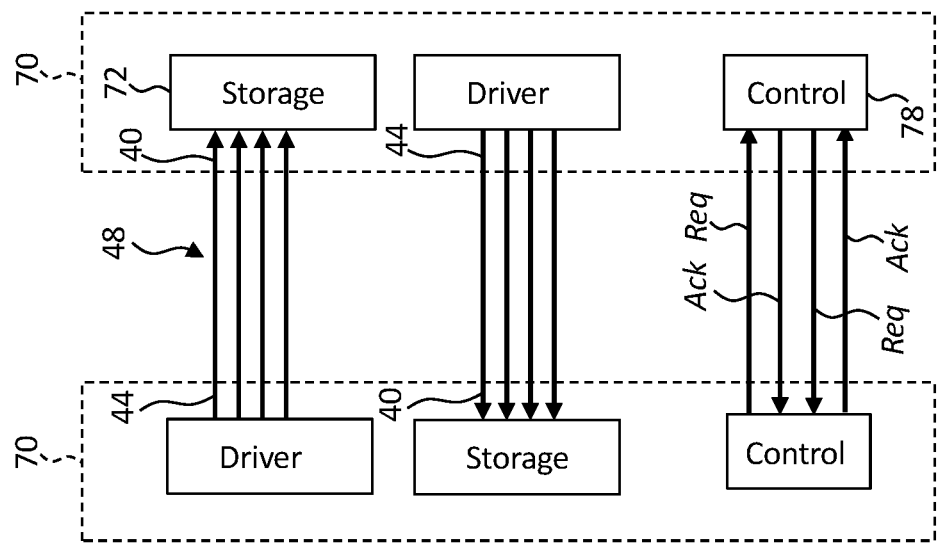
FIGS. 6A and 6B are schematics of connections between computing elements according to illustrative embodiments of the present disclosure.
Figure 6A:
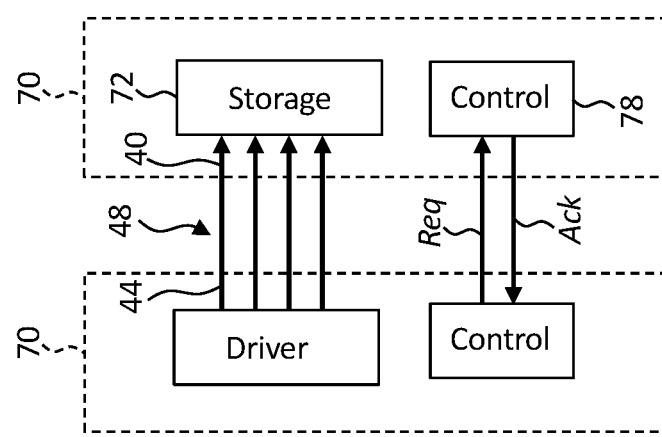
Figure 7:
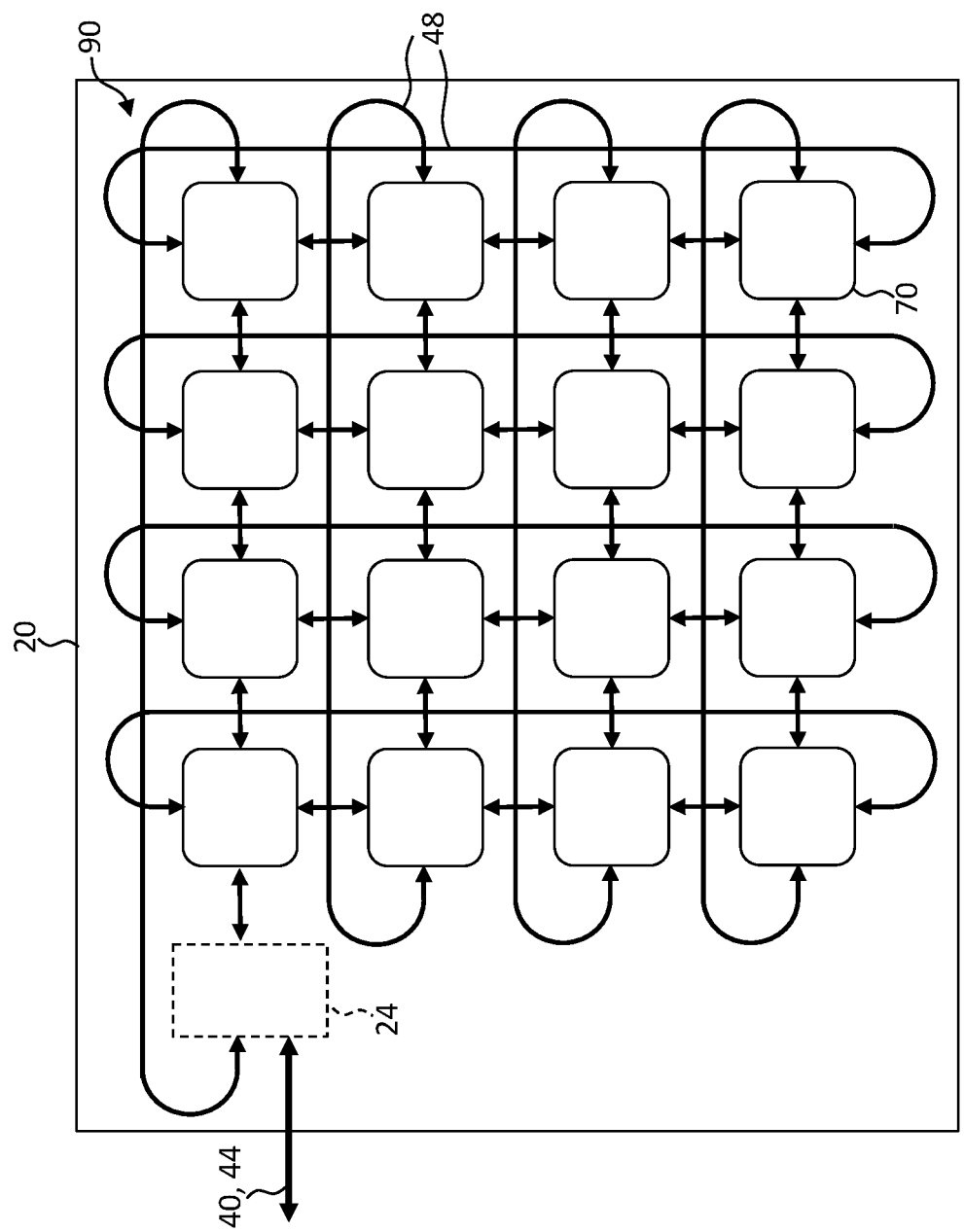
FIG. 7 is a schematic of a torus-connected computing accelerator comprising an array of computing elements according to illustrative embodiments of the present disclosure.

According to general embodiments of the present disclosure and as illustrated in FIG. 4 and the details of FIGS. 5A, 5B, 6A, and 6B, computing accelerator 20 comprises an array of computing elements 70 connected by connections 48, as shown in FIG. 4. The array in FIG. 4 is illustrated as a two-dimensional grid, but embodiments of the present disclosure are not so limited and can comprise a one-dimensional array, a two-dimensional array, a ring, a torus (as illustrated in FIG. 7), a three-dimensional array or other arrangement of connected computing elements 70.

As shown in FIG. 5A, each computing element 70 comprises a computing element control circuit 78, a storage circuit 72, and an operation (e.g., calculation) circuit 74 that performs an operation (e.g., a mathematical operation such as a matrix-vector product) on input data 40 stored in storage circuit 72. FIG. 5B illustrates computing elements 70 that receive input data 40 for an operation from more than one connection 48, depending on the type of operation performed (e.g., adding or multiplying two or more data values D or vectors received separately from two or more connections 48).

Storage circuit 72 is operable to receive input data 40 from one of connections 48 and then store received input data 40. Storage circuit 72 can be one or more shift registers, memories, or flipflops. Input data 40 is information communicated on connection 48, for example data values and metadata for example describing operations and data routing through the array of computing elements 70. Both connection 48 and input data 40 are represented with a connecting arrow indicating the source of input data (e.g., output data 44 from a neighboring computing element 70) and the destination of input data 40, e.g., as illustrated in FIG. 6A. FIG. 6B illustrates a bidirectional connection 48 between two neighboring computing elements 70 in which separate wires are used to communicate data. In some embodiments, the same wires are used to communicate data passed in both directions, for example with a tristate driver and storage circuit 72 that provides a high resistance when not in use.

According to embodiments of the present disclosure and as shown in FIGS. 6A and 6B, each computing element 70 can communicate with a neighboring computing element 70 using a signal handshake. The source (sending) computing element 70 can generate a request signal Req indicating that it is ready to send a data packet 80 and also outputs data packet 80, for example on one or more wires connecting neighboring computing elements 70 (e.g., serially or in parallel). When a receiving computing element 70 neighbor receives the request signal Req, it inputs and stores data packet 80 and provides an acknowledge signal Ack that is sent back to sending computing element 70, for example on wires connecting neighboring computing elements 70 that make up connections 48. After sending computing element 70 receives the acknowledge Ack, data packet 80 is no longer output by sending computing element 70 and the data transmission and receipt are complete.

FIG. 4 illustrates an embodiment in which a data control circuit 24 comprising an input control circuit 26 receives input data 40 and communicates input data 40 to one or more computing elements 70, for example through an input bus 42 connected to one or more computing elements 70, for example on an edge of the array of computing elements 70 in a grid configuration. Similarly, data control circuit 24 can comprise an output control circuit 28 that receives processed output data 44 from one or more computing elements 70, for example through an output bus 46 connected to one or more computing elements 70, for example on an edge of the array of computing elements 70 in the grid configuration, and communicates the processed output data 44, for example to memory 12 or processor 14 of hardware system 10. In some embodiments of the present disclosure and as illustrated in FIG. 7, data control circuit 24 is connected by one or more connections 48 to one or more computing elements 70 and to an external source of input data 40 and destination for processed output data 44. Data control circuit 24 can be a type of computing element 70. In the embodiments illustrated in FIG. 7, computing elements 70 are connected with connections 48 in a torus (a two-dimensional ring) with data control circuit 24 connected in the ring of one of the rows.

According to embodiments of the present disclosure, data packets 80 flow through the array of computing elements 70 to perform operations on data values D stored in target-tags T in response to routing values R (shown in FIG. 8B) that are communicated with data values D, as illustrated in FIG. 8A. Routing values R dictate the route that a data packet 80 follows through the array of computing elements 70. According to embodiments of the present disclosure, the operations performed on the data values are determined by the operation of the computing element 70 in which data values D are stored. The operations can be mathematical operations changing data values D, timing operations (e.g., providing a delay in data packet 80 transmission between computing elements 70), storage operations for storing data packets 80 (e.g., a memory), or routing operations for transmitting data packets 80 on connections 48 (e.g., comprising a communications circuit).

According to some embodiments, each computing element 70 comprises or stores a self-tag S that identifies computing element 70 or its operation. Self-tags S do not need to be unique and can be the same for computing elements 70 that perform the same operation. When self-tag S of a compute element 70 matches a computing element 70 identifier C, target-tag T of a data packet 80, the operation is performed. According to some embodiments, no self-tags S or computing element 70 identifiers C are used. Instead, routing values R encode a no-route N value that, when encountered by a computing element 70, indicates that the operation of computing element 70 should be performed on data value D. A no-route value N of the routing values R is any value that computing element 70 recognizes as indicating that data packet 80 is not to be transmitted on connection 48 but rather enables the operation of computing element 70 on data values D of data packet 80 and can comprise a non-connection (e.g., no-route) value or a zero count value of the remaining routing values R (e.g., no routing values R remain in the list). The name indicates that rather than routing data packet 80 to a connection 48 (normally indicated by a routing value R), an operation is performed. In some embodiments, routing values R include a counter that specifies the number of routing steps remaining; when the counter equals zero, the operation is performed. FIG. 8C illustrates a target-tag T for such embodiments. According to embodiments of the present disclosure, identifying the computing element 70 in which data packet 80 is present with computing element 70 specified by target-tag T in data packet 80 can comprise (i) matching a self-tag S stored in computing element 70 to computing element 70 identifier C (discussed with respect to FIGS. 11A-12) or can comprise (ii) detecting a no-route N routing value R (discussed with respect to FIGS. 13A-4). No-route value N is one of various possible routing values R. Other routing values R can comprise routing connection 48 identifiers, routing instructions, or a routing value count.

As illustrated in FIG. 8A, input data 40 (and output data 44) can be provided in a data packet 80 comprising a data value D (e.g., multiple bits of one or more digital numbers) and a target-tag T. In some embodiments and as shown in FIG. 8B, target-tag T can comprise metadata specifying one or more computing element 70 identifiers C, one or more routing values R, one or more constants k used by operation circuit 74, and any other useful metadata. Target-tag T can comprise any other packet header information that is useful in the operation of computing element 70. In some embodiments and as shown in FIG. 8C, target-tag T can comprise metadata specifying one or more routing values R, including no-route values N, one or more constants k used by operation circuit 74, and any other useful metadata. Target-tag T and the various values in target-tag T can be a digital bit string or list and can employ a fixed number of bits for various elements (e.g., operation specification, routing values R) or employ a dynamic bit allocation for the values encoded in target-tag T. Target-tag can include a count of routing bits in target-tag T. Computing element identifiers C and routing values R can be provided in an ordered list in target-tag T. In some embodiments, the ordered lists comprise a pointer (e.g., an address) indicating the current, operative, or exposed value in the list or a counter indicating the number of remaining values in the list. If a counter equals zero, no more routing steps are available and the operation is performed. In some embodiments, the current, operative, or exposed value is the first in, or at the top of, the list, for example as specified by order or address in the list.

In some embodiments, for example those with target-tags T that comprise computing element 70 identifiers C, computing element 70 stores a self-tag S that identifies an operation performed by operation circuit 74. Self-tag S can be one of one or more configuration variables V stored in computing element 70. Self-tags S can be hardwired in computing elements 70 or stored as firmware or input as a configuration variable V. In some embodiments, self-tags S are configuration variables V loaded into computing element 70, e.g., from an external controller in an initial configuration step for the array of computing elements 70.

In some embodiments of the present invention, computing element control circuit 78 is operable to receive target-tag T, parse target-tag T to extract computing element 70 identifier C or a current routing value R, either compare computing element 70 identifier C in target-tag T to self-tag S or recognize no-route value N of routing value R, enable the operation corresponding to computing element 70 to process data value D if the comparison matches, respond to routing values R to route data packets 80, modify target-tag T, and enable output of processed output data 44 or simply route input data 40 if the comparison does not match. Computing element control circuit 78 can enable or comprise routing (pass-through) circuits communication input data 40 from a connection 48 to output data 44 on another different connection 48, e.g., as shown with the dashed line in FIGS. 5A and 5B. Operation circuit 74 is operable to process data value D (input data 40) to form processed output data D (output data 44) in a process data packet 80 that is output on one of connections 48, e.g., as output data 44.

Computing elements 70 can be digital computing elements 70 and comprise all digital circuits. In some embodiments, computing elements 70 can comprise analog circuits. Computing element control circuits 78 can likewise comprise digital circuits, logic, storage elements such as flip-flops and latches, and can comprise a micro-controller, state machine, or discrete control logic. Operation circuits 74 can comprise, for example, adders, multipliers, filters (e.g., a first-order filter), transform circuits (e.g., linear or non-linear transforms performed by, for example, lookup tables). Operation circuits 74 can employ constants k (e.g., multiplicative or additive constants) provided as a configuration variable V by computing element control circuit 78 that can be loaded into particular computing elements 70 before input data 40 is provided to computing elements 70. In some embodiments, constants k can be included in target-tag T as shown in FIGS. 8B and 8C.

Under the control of computing element control circuit 78, input data 40 can be loaded into each storage circuit 72 at the same time in response to a common clock provided to each computing element 70. In some embodiments, alternating storage circuits 72 are controlled by a positive-going edge of a clock and the negative-going edge of the clock to avoid race conditions. The clock period cannot exceed the time needed for operation circuit 74 to process data value D. In such embodiments, each computing element 70 is synchronous and performs a calculation at the same time on a different data element. In some embodiments, computing elements 70 are asynchronous and operate independently and in response to data packets 80 transmitted from one computing element 70 to another computing element 70. In either case, data packets 80 can flow through the array of computing elements 70 and, because a large number of computing elements 70 can be included in the array and operate simultaneously, a high calculation and data rate can be achieved. Moreover, computing elements 70 that are not employed at any given time to perform operations are relatively quiescent, saving power in the array of computing elements 70.

Figure 9:
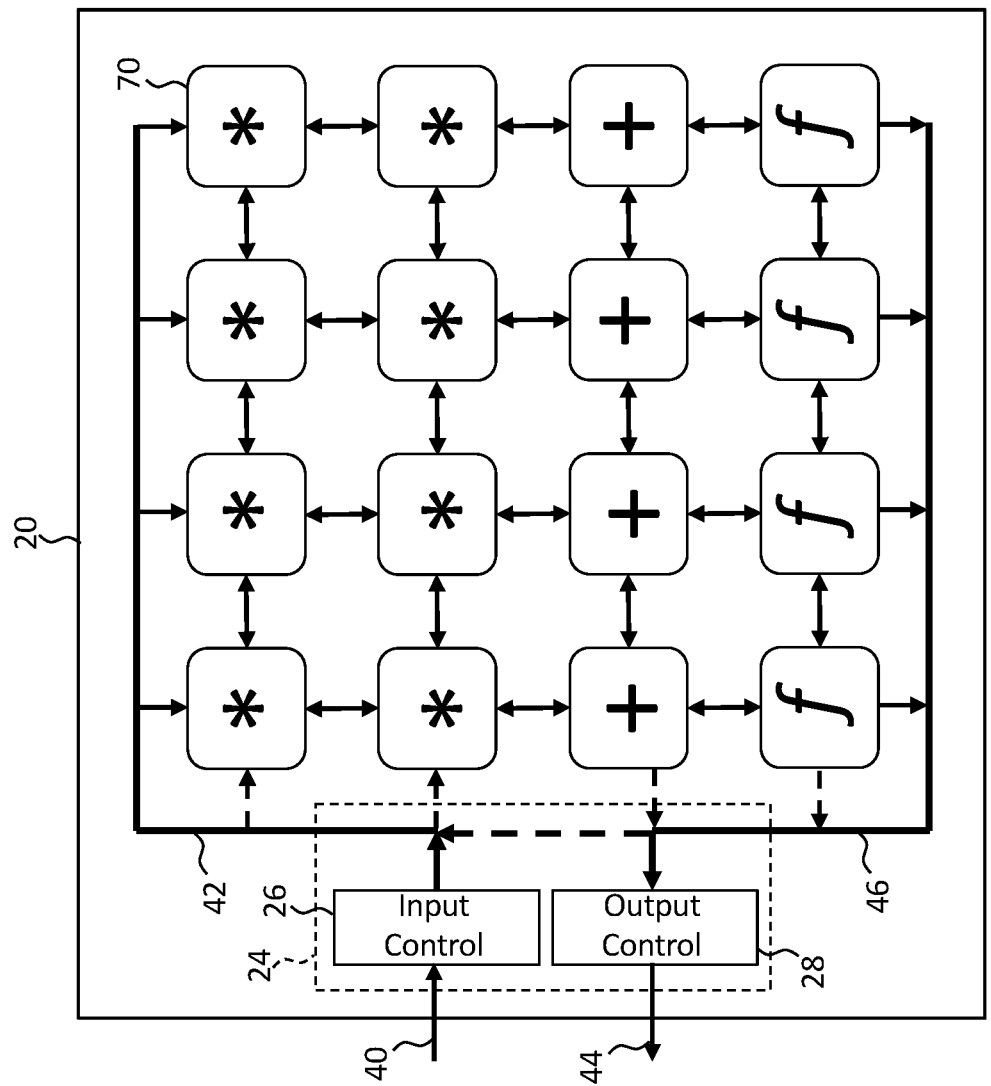
FIG. 9 is a schematic of an array of computing elements according to illustrative embodiments of the present disclosure.

FIG. 9 illustrates an array of computing elements 70 with the operation of each computing element 70 labeled. Computing elements 70 need not all be identical and can have different operation circuits 74. Some of computing elements 70 can comprise an operation circuit 74 to compute a matrix-vector product (e.g., using analog or digital hardware that implements a function e.g., as illustrated in the circuit of FIG. 3). Some of computing elements 70 comprise an addition operation circuit 74 to add two vectors together. Some of computing elements 70 comprise a transformation operation circuit 74, for example a linear or non-linear function implemented by a lookup table. In some embodiments, computing element control circuit 78 comprises circuits operable to determine whether an operation can be performed (e.g., a match between data packet 80 and computing element 70 exists) and enable the operation with operation circuit 74 if possible or pass data packet 80 to neighboring computing elements 70 if the operation cannot be performed, e.g., as a pass-through routing operation or function. Some computing elements 70 can be routing nodes that control data packet 80 routing or memory nodes that store or delay data packets 80, for example comprising an array of shift registers or an SRAM (static random access memory) under the control of computing element control circuit 78.

According to some embodiments of the present disclosure, each computing element 70 has a fixed calculation function (e.g., an operation circuit 74 that is only one of an adder, a multiplier, and a lookup table). According to some embodiments, computing elements 70 can comprise multiple calculation circuits (e.g., more than one of an adder, a multiplier, and a lookup table) and a configuration selection of the desired calculation stored in the computing element 70, for example received in target-tag T. For example, each computing element 70 can implement a state machine that is selected depending on the computation desired. Target-tag T can specify one or multiple operations to be performed on data value D. Some of the multiple operations can be performed by a single computing element 70. When the operation is completed, target-tag T can be modified. According to some embodiments, the operation of computing element 70 can be configured, for example in response to configuration variable V, to perform a selected or desired operation or function chosen in response to a pre-defined compute graph. According to some embodiments, configuration variable(s) V select an operation or operational mode. Configuration variable V that selects an operation can, for example, select a mathematical operation where operation circuit 74 comprises hardware for calculating different or multiple operations (e.g., first and second operation circuits 74 that can be any one or more of additions, accumulator calculating a sum of multiple values, multiplications, matrix-vector products, linear transformations, non-linear transformations) or a pass-through routing function in which data packets 80 are simply communicated to a different neighboring computing element 70.

According to some embodiments of the present disclosure, two or more computing elements 70 connected in an array can input data 40 from any neighboring computing element 70 in the array, for example from the left, the right, the top, or the bottom over point-to-point connections 48 as shown in FIGS. 4 and 7. Computing elements 70 on the edge of the array can be connected to a data control circuit 24 comprising an input control circuit 26 and an output control circuit 28, for example through an input bus 42 or an output bus 46, or both. Input bus 42 and output bus 46 can be (but are not necessarily) a common bus connected to one or more computing elements 70 on the edge of the array of computing elements 70 but are illustrated separately to aid understanding. Thus, computing elements 70 internal to the array can be connected through connections 48 to four neighboring computing elements 70 and those computing elements 70 on the edge of the array can be connected through connections 48 to two or three neighboring computing elements 70. In the embodiments of FIG. 7, only data control circuit 24 is connected to input and output buses 42, 46 and input data 40 and output data 46 are communicated through connections 48 to data control circuit 24.

Control circuits 78 in computing elements 70 can be communicatively connected in a daisy chain (or with a common bus) to communicate configuration variables, including self-tags S, mathematical constants, and operational mode selections.

According to embodiments of the present disclosure, data packets 80 flowing through the array of computing elements 70 can be controlled, at least in part, by target-tags 82 associated with each data packet 80. Thus, a complex centralized control and communication mechanism is not required.

According to embodiments of the present disclosure and as illustrated in FIG. 8A, data packet 80 comprises data values D (e.g., numbers that are mathematically manipulated by operation circuits 74) and a target-tag T. As shown in FIG. 8B, target-tag T can comprise a computing element 70 identifier C that identifies an associated operation on data value D and can comprise routing values R. As shown in FIG. 8C, target-tag T can comprise routing values R that include a no-route N value that identifies computing element 70 to perform an associated operation on data value D (e.g., target-tag T indicates that computing element 70 in which target-tag T is present is to perform the operation of computing element 70 and therefore identifies computing element 70). Identification of computing element 70 can comprise matching a computing element 70 label or operation or identifying a no-route value N routing value R (e.g., a null value or count that is not a connection 48). Target-tags T can therefore operate as a form of dynamic configuration variable that controls the operation of operation circuit 74 and the flow of data packets through the array of computing elements 70.

As illustrated in FIG. 9, each computing element 70 has an associated operation that it can perform on data value D. In the illustration, computing elements 70 marked '*' can perform a matrix-vector product operation (referred to as a 'multiplication' herein) using the indicated weight W value (for example provided as a configuration variable, hardwired in computing element 70, or provided as part of data packet 80), computing elements 70 marked '+' can perform an addition or accumulation operation, and computing elements 70 marked 'ƒ' can perform transformations (e.g., with a lookup table). If a target-tag T matches computing element 70, e.g., as determined by computing element control circuit 78 matching self-tag S to computing element identifier C or by identifying a no-route N routing value R (e.g., a null value or a zero count of routing values), the operation of computing element 70 is performed on data value D by operation circuit 74 as enabled by computing element control circuit 78. Target-tags T can be modified as they pass through computing elements 70, e.g., a list of computing elements 70 by computing element control circuit 78 as operations are completed and a list of routing values R as data packets 80 are routed through the array of computing elements 70.

In embodiments of the present disclosure, an array of computing elements 70 can be initialized, for example in hardware or by sending configuration variables V to each computing element 70 in the array, for example by processor 14 of hardware system 10. In some embodiments, configuration variables V can include self-tags S identifying each computing element 70 and associated operation (if computing elements 70 do not have a hardwired operational identifier). In some embodiments, self-tags S are not used and are not included in configuration values V or hardwired each computing element 70.

Figure 10:
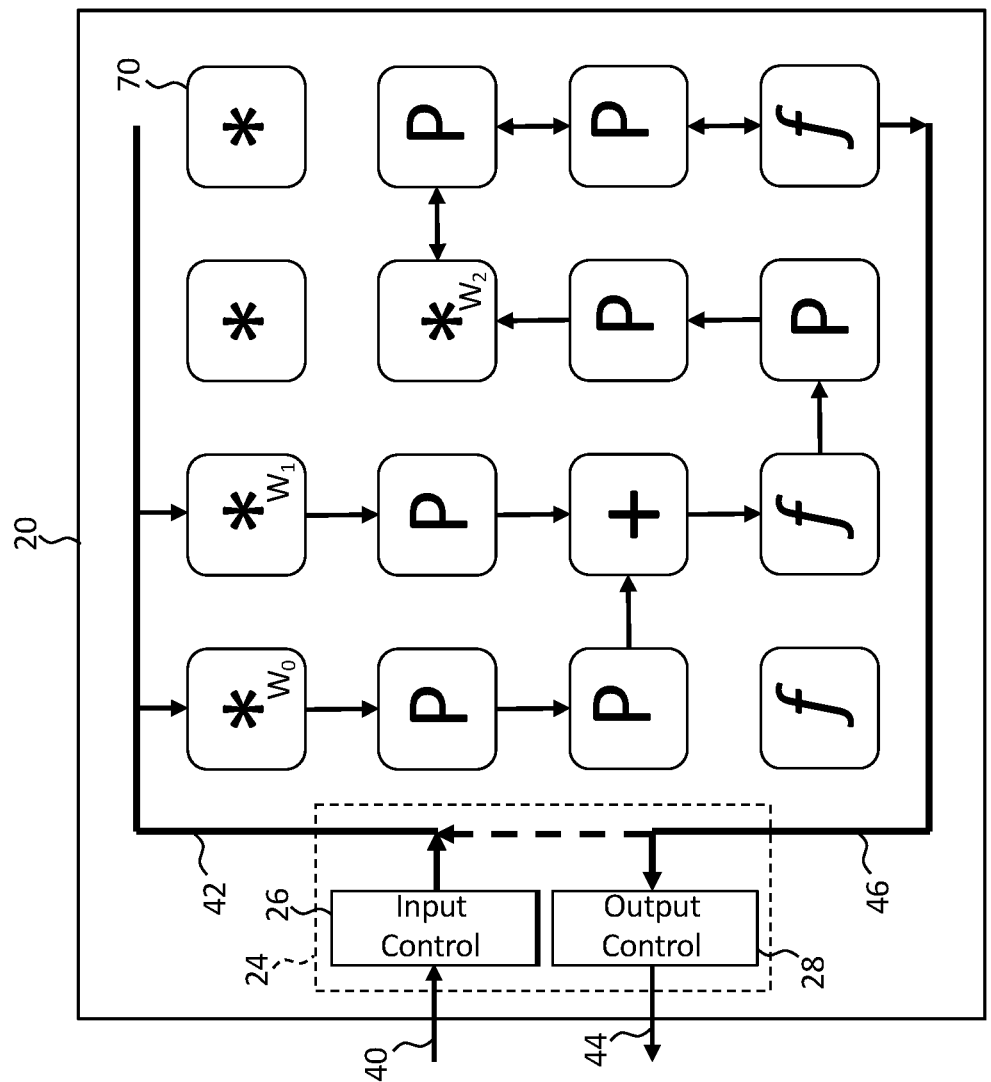
FIG. 10 is a schematic of an array of computing elements illustrating data flow according to illustrative embodiments of the present disclosure.

As illustrated in FIG. 10, an external compiler (e.g., comprising software running on processor 14 of hardware system 10 shown in FIG. 1) constructs a set of data packets 80 comprising data values D, computing elements 70 identifiers C, if used, and routing information R, including no-route values N, if used, encoding one or more compute graphs specifying one or more operations to be performed in a desired order on data values D as routed by routing values R. Target-tag T can comprise compute element 70 identifiers C, if used, and route values R, for example provided in a list in Target-tag T in which the next compute element 70 operation to be performed or route value R to be used is the first value in an associated list and is therefore exposed for the next step, e.g., the current value for the next operation or connection 48 output. Data packets 80 are provided to data control circuit 24 (e.g., by processor 14) and data control circuit 24 provides them to specific computing elements 70 on input bus 42 (as shown in FIG. 4) or through connection 48 (as shown in FIG. 7). The receiving computing element control circuits 78 each either compare computing element 70 identifier C specified in target-tag T to their self-tag S or identify a no-route N value R. If computing element control circuit 78 makes a match, the indicated operation is performed, data value D is processed, and processed data value D is output on a connection 48, for example on connection 48 defined in hardware, in configuration variable V, or as defined by a routing value R. Target-tag T can be modified to remove routing value R and, if used identifier C, so that a new routing value R is exposed (e.g., in a list) and a new identifier C, if used. (The actual values in the lists can be removed or overwritten or, in some embodiments, a list pointer is used to indicate the next routing value R or identifier C, if used.). If a match is not made, the operation associated with computing element 70 is not performed. Instead, routing value R is removed from a list of routing values in target-tag T and modified data packet 80 is output on connection 48 indicated by removed routing value R.

The process continues, with each computing element 70 that receives a data packet 80 performing the task indicated by target-tag T. The compiler responsible for constructing the original data packet 80 configures the series of routing values R and computing element 70 identifiers C, if used, to route data packets 80 and perform the desired computation on the desired computing elements 70. If used, a special end-tag E computing element 70 identifier C can be defined that does not match any computing element 70 self-tag S. End-tag E can enable processed output data 44 values D to route through the array as indicated by routing values R without further processing by any operation circuit 74 and be transmitted through output bus 46 to data control circuit 24 as shown in FIG. 4, or a connection 48 as shown in FIG. 7. Data packets 80 can be recirculated through the array of computing elements 70 by data control circuit 24 to continue processing. Multiple data packets 80 can be introduced at the same time into the array of computing elements 70 to keep computing elements 70 busy and use computing elements 70 as efficiently as possible.

The example of FIG. 10 illustrates a computation $y=g(f((W_0*x)+(W_1*x))*W_2)$ where x is an input vector (input data 40), y is an output vector (processed output data 44), and functions g and f are non-linear transformations. As shown in FIG. 10, data values D in data packets 80 are provided to the upper left two computing elements 70 in the array where the functions $(W_0*x)$ and $(W_1*x)$ are performed, respectively. The processed data packets 80 are then passed to neighboring bottom computing elements 70 as specified by the first routing value R. The receiving computing element 70 cannot perform the required next addition function (as shown in FIG. 9) so data packet 80 is routed to the next bottom computing element 70, as specified by the next routing value R, thus performing a pass-through function indicated by a 'P' in FIG. 10. The next operation is an addition requiring input data 40 from two computing elements 70, so data packet 80 for the $W_0$ product is communicated to the right (according to the next routing value R). Data packets 80 are then input from above and the left by the next computing element 70, the addition performed, target-tag T modified to expose the next operation and routing value R, and the result of the addition passed to a computing element 70 computing a function transformation $f$. Again, self-tag S and the exposed operation for target-tag T match, so the functional transformation $f$ is performed, the processed data value D is transmitted to the right, according to the next routing value R. Data packet 80 is then transmitted up twice, according to subsequent routing values R to the next operation, a multiplication step with weight $W_2$. The result of the multiplication is passed to the right and then down twice, as indicated by the next routing values R, to the final matching computing element 70 performing a functional transformation $g(x)$. The processed output data 44 is then communicated to the data control circuit 24 and removed from the computing array.

In general, an operation can require input from one or more connections 48 and computing element control circuit 78 can enable input data 40 from any one or more of connections 48. Moreover, input data 40 (e.g., from data packet 80) from different connections 48 can arrive at different times and computing element control circuit 78 can delay operations until all of the necessary data arrives, for example using a counter whose value can be encoded in target-tag T and specified by the compiler. Moreover, in some embodiments, a computing element 70 can store data packets 80 internally while routing other data packets 80 not needed for the next operation, e.g., in a memory node. Thus, data packets 80 can be routed efficiently without delay for unrelated operations to take place.

The compute graph illustrated in FIG. 10 can also be implemented with the toroidal array of computing elements 70 shown in FIG. 7. In some such embodiments, data packets 80 comprising data values D (input data 40) and target-tags T are compiled externally to the array and communicated (e.g., through a bus) to data control circuit 24 (e.g., a specialized computing element 70). Data control circuit 24 communicates data packets 80 to computing elements 70 in the array through connections 48. For example, the first two multiplication operations with $W_0$ and $W_1$ can be performed by the left-most and right-most computing elements 70 in the top row in the array of computing elements 70. The processed data in the left-most computing element 70 and processed data in the right-most computing elements 70 are then shifted down two computing elements 70, the right-most data is shifted one computing element 70 to the right, and the processed data from the two multiplication computing elements 70 is added. The added data is shifted down one computing element 70, a transform operation is performed, and the process then proceeds as described above.

Figure 11A:
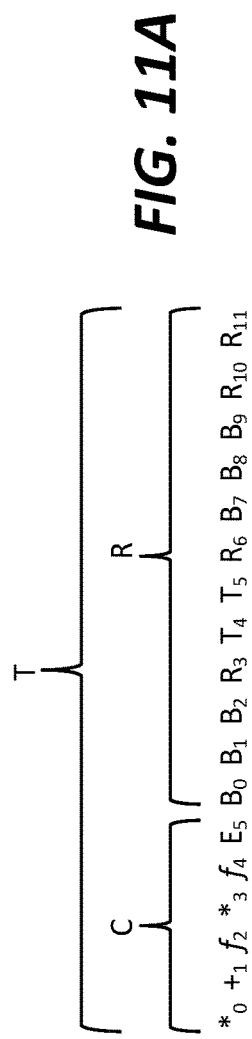
FIGS. 11A-11M are consecutive target-tags for a compute graph performed by the array of computing elements using self-tags and computing element identifiers according to illustrative embodiments of the present disclosure.
Figure 11B:
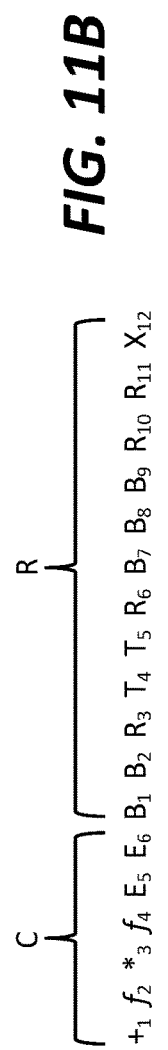
Figure 15:
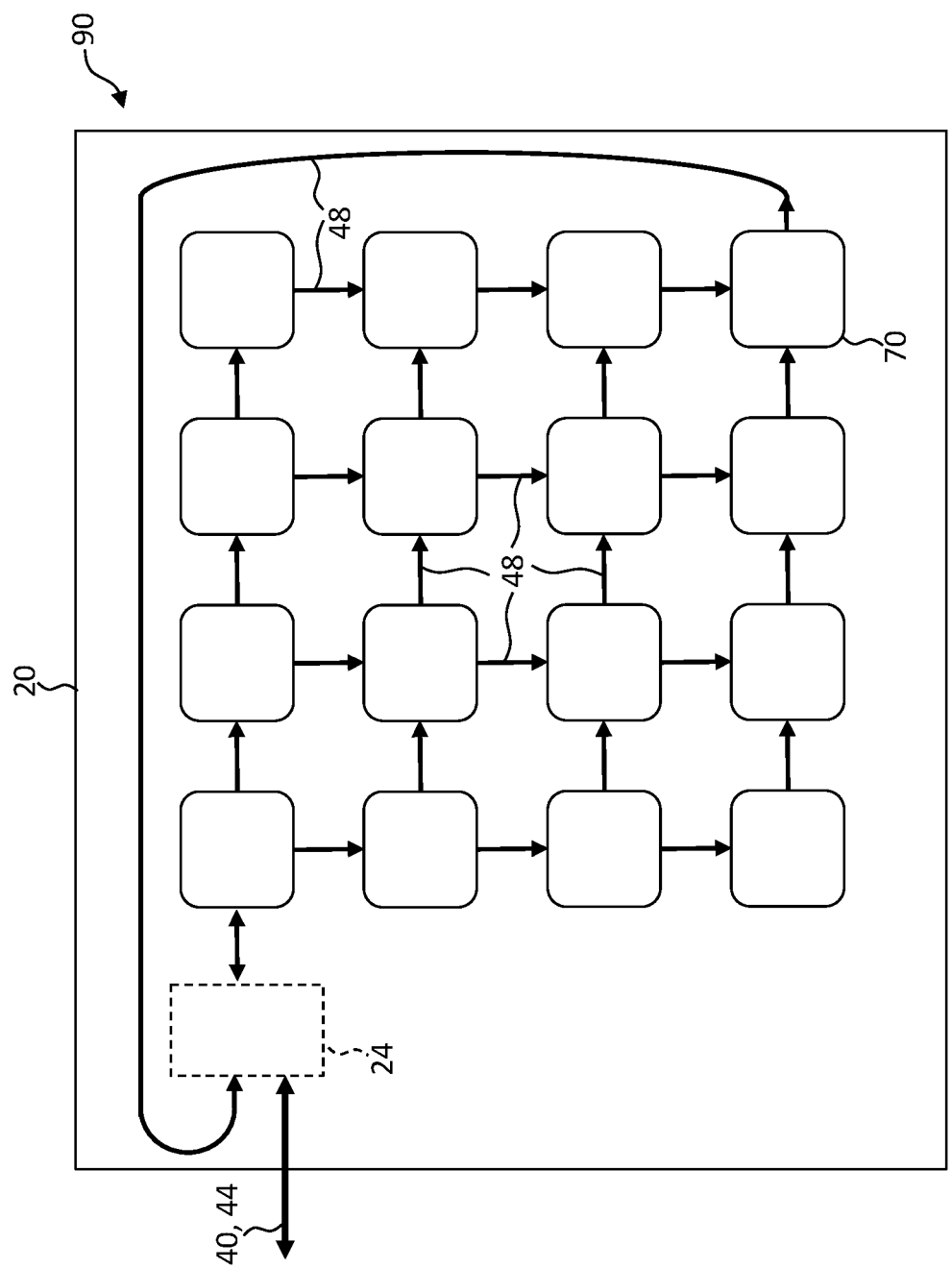
FIGS. 15-19 are schematics of arrays of computing elements according to illustrative embodiments of the present disclosure.

As noted above, data packet 80 control flow can be implemented with self-tags S stored in each computing element 70 and computing element identifiers C communicated in target-tag T. FIG. 11A-11J illustrate a simplified example of a target-tag T associated with the first data packet 80 in such embodiments. FIGS. 13A-13J illustrate embodiments that do not use self-tags S and identifiers C, as in FIGS. 11A-11J, but use no-route N routing values R. As shown in FIG. 11A, computing element 70 identifiers C are marked with the function associated with the computing element 70, '*' (multiplication), '+' (addition), '$f$' (functional transform), 'E' (end-tag or no-operation) and a subscript indicating the process order. Routing values R are likewise marked in order and indicated with a 'B' (bottom), 'L' (left), 'R' (right), and 'T' (top) corresponding to the connection 48 extending from computing element 70 in the indicated direction. 'X' indicates an arbitrary routing value R that is unused. Routing values can be multi-bit binary values, for example two-bit values indicating each of connection 48 directions. In some uni-directional arrangements, as shown in FIG. 15 discussed below, a single bit can suffice to select one of two possible connections 48.

Figure 11C:
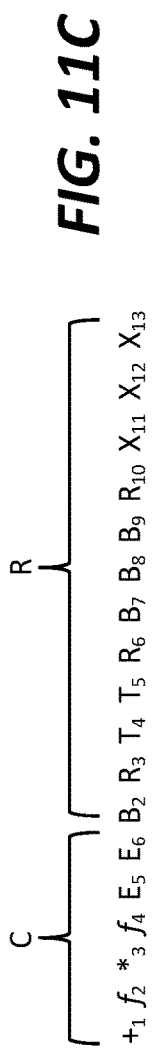
Figure 11D:
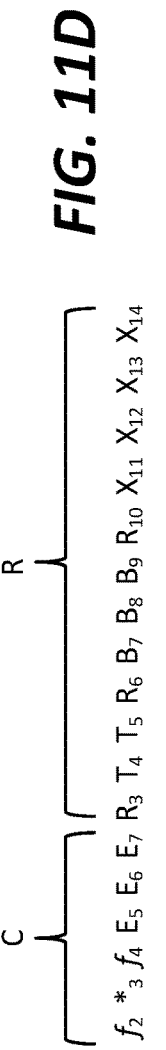
Figure 11E:
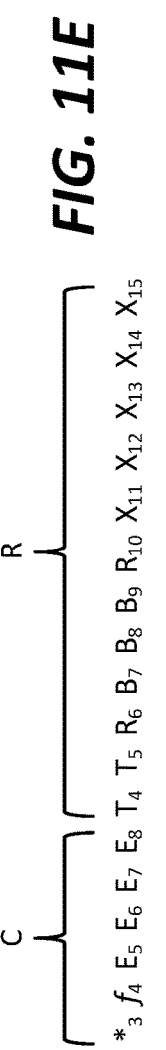
Figure 11F:
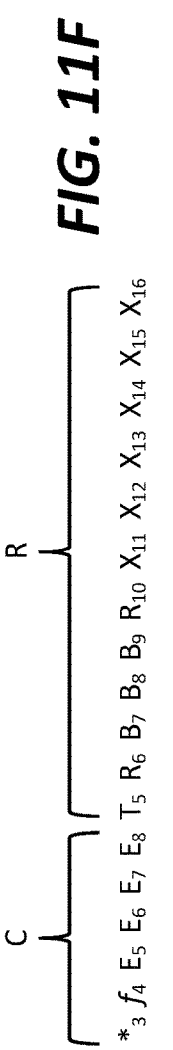
Figure 11G:
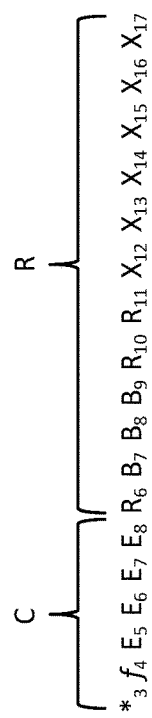
Figure 11H:
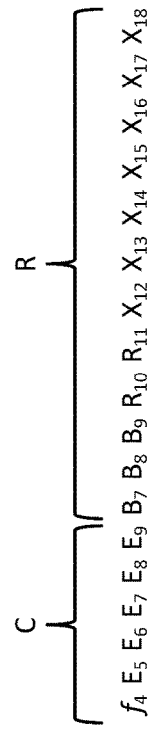
Figure 11I:
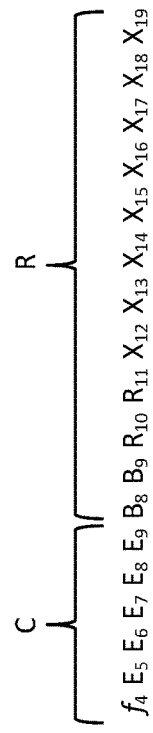
Figure 11J:
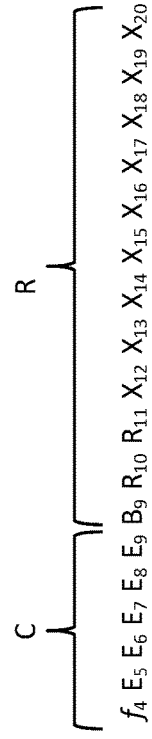
Figure 11K:
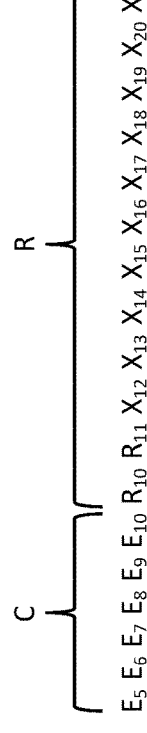
Figure 11L:
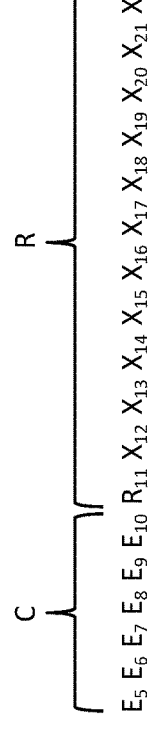
Figure 11M:
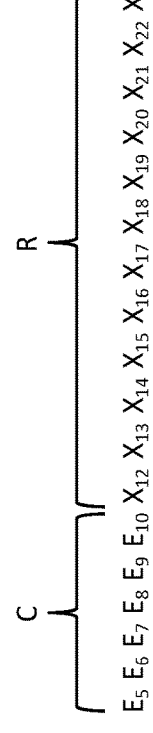

The first operation '*' in the target-tag T matches the upper left computing element 70 and is performed. Computing element control circuit 78 then removes the operation and the routing value 'B' from the target-tag T, filling the identifier C portion of target-tag T with another end-tag and an arbitrary routing value (indicated with an 'X'), and outputs the result of the multiplication on bottom connection 48 with updated target-tag T of FIG. 11B. The target-tag T update can be hardwired in digital logic or performed as firmware in a microcontroller, or in other logic circuits as will be apparent to those skilled in the digital circuit arts. Since the next, exposed operation is a '+' and does not match the computing element 70, only routing value R of data packet 80 is amended and output on the bottom connection 48, as shown in FIG. 11C. This computing element 70 matches the exposed operation '+', the addition operation is performed, and the addition data value D result routed through the bottom connection 48, with updated target-tag T for both operation and routing value R, shown in FIG. 11D. The next operation 'f', also matches, the operation is performed, and the data packet 80 with updated target-tag T is output on the right connection 48, as shown in FIG. 11E. Data packet 80 is then routed upwards two computing elements 70 to encounter a multiplication computing element 70, as shown in FIGS. 11F and 11G. After the multiplication operation is performed, the result is sent through right connection 48 and the operation and routing values updated as shown in FIG. 11H. Since the next two computing elements 70 do not match the exposed function 'f', data packet 80 is sent through bottom connection 48 twice, as shown in FIGS. 11I and 11J. After the 'f' operation is performed, data packet 80, as shown in FIG. 11K, is sent down again and around up to the top row of computing elements 70 in the four-by-four array of computing elements 70. Since an end-tag is now exposed, no operation will match or will be performed and updated data packets 80 are sent to the right twice, as shown in FIG. 11L and FIG. 11M according to routing values R. At this point, data packet 80 has reached data control circuit 24 again and, since the exposed operation is an end-tag, data control circuit 24 outputs the computed result.

Figure 12:
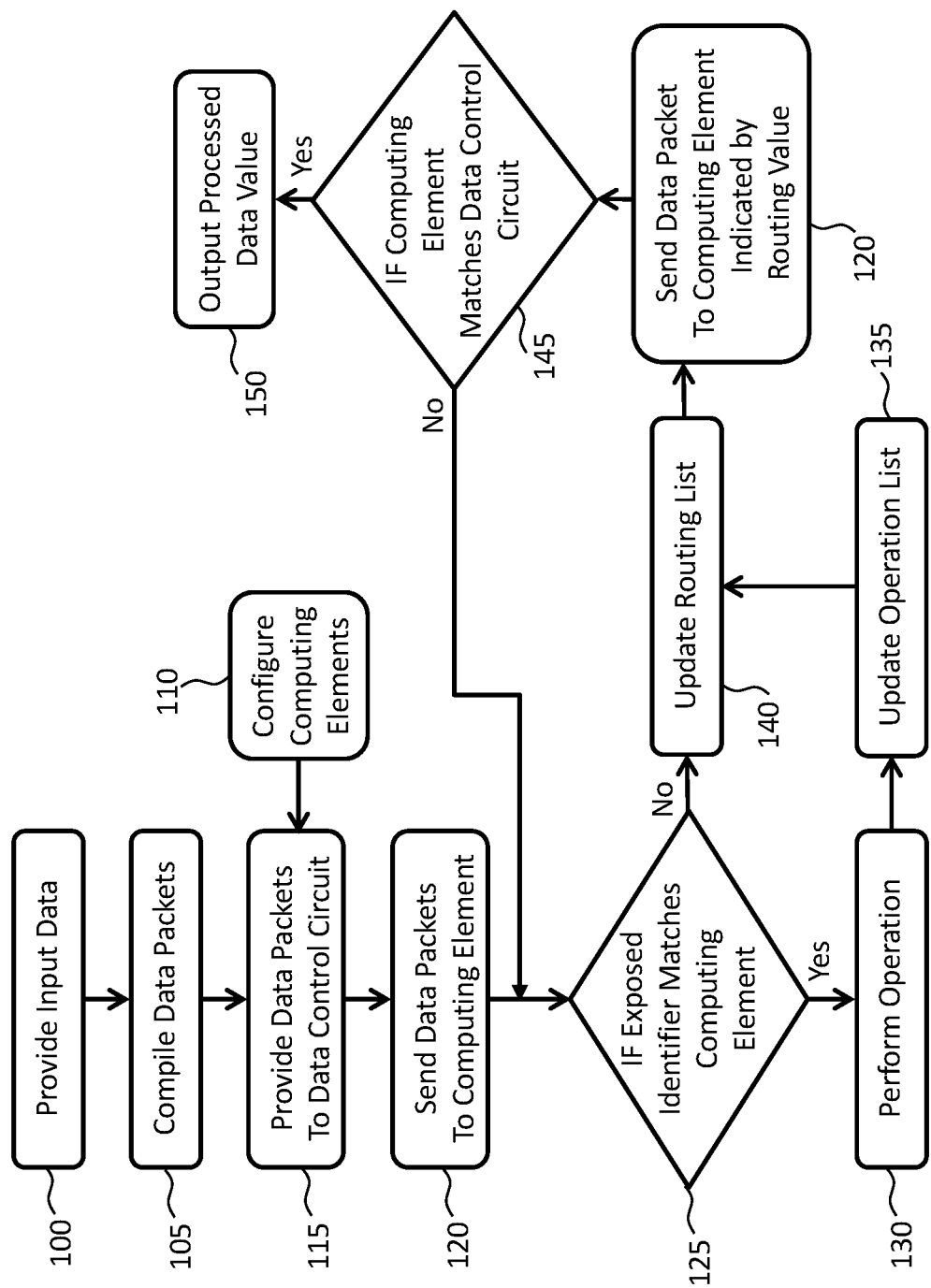
FIG. 12 is a flow diagram illustrating data and computation flow of a compute graph in the array of computing elements corresponding to FIGS. 11A-11M according to illustrative embodiments of the present disclosure.

The overall operational flow is illustrated in the flow diagram of FIG. 12 (corresponding to the array of computing elements 70 illustrated in FIG. 7). As shown in FIG. 12, in step 100 input data 40 is provided to the system, for example from sensors 30 to hardware system 10 (as shown in FIG. 1). Input data 40 is compiled into data packets 80 in step 105, for example by processor 14. Computing elements 70 are configured (e.g., with configuration values such as self-tags S, if they are not hard-wired) in step 110 and data packets 80 are transmitted to data control circuit 24 in step 115. Data control circuit 24 then sends data packets 80 into the array of configured computing elements 70 in step 120, for example through input bus 42 (shown in FIG. 4) or connections 48 (as shown in FIG. 7). If the current exposed computing element 70 identifier C (e.g., the current computing element 70 identifier C at the top of a list of computing elements 70 identifiers C) matches the capability of the receiving computing element 70 (e.g., computing element 70 identifier C matches self-tag S) in step 125, the operation is performed in step 130, and the identifier list is updated in step 135. If the current identifier C does not match computing element 70 self-tag S in step 125, no operation is performed. Data packet 80 is routed to a neighboring computing element 70 through connection 48 indicated in the routing list in step 145 after updating the routing list in step 140. If receiving computing element 70 is data control circuit 24 the compute graph is complete in step 145 and the processed data output in step 150. If the receiving computing element 70 is not data control circuit 24 (or, alternatively, if data control circuit 24 does not detect an end-tag E identifier C), the process continues until the processed data is communicated to data control circuit 24. For example, data control circuit 24 can route data from one side of the array to the other in the row in which data control circuit 24 is connected.

FIGS. 13A-13J illustrate embodiments that do not use self-tags S and identifiers C, as in FIGS. 11A-11J, but use no-route N routing values R. In embodiments, routing values R can be multi-bit tags indicating either a routing connection 48 or a performance operation (e.g., no-route value N). In a non-limiting example, each routing value R has two bits, 00 indicating performance operations, 01 indicating routing to the first connection 48, 10 indicating routing to the second connection 48, and 11 indicating routing to the third connection 48 in a clockwise direction from connection 48 on which data packet 80 is received. (In this example data packets 80 are not returned back through connection 48 on which data packet 80 was received, but in other examples, e.g., with three-bit routing value R, such a return is possible.) Routing values R are marked in order and indicated with a 'B' (bottom), 'L' (left), 'R' (right), and 'T' (top) corresponding to the connection 48 extending from computing element 70 in the indicated direction. 'X' indicates an arbitrary routing value R that is not used. The use of routing values R (including no-route values N) provides advantages including increased simplicity (because no self-tags are necessary) and reduced circuitry. As will be appreciated by those knowledgeable in the digital circuit design arts, a variety of logical mechanisms can be provided to indicate that a computation is to be performed. For example, in some other embodiments, routing values R are replaced with null values (e.g., no-route values) after each transmission over connection 48. When a list of routing values R is filled with null values, an operation is performed. Embodiments of the present disclosure are not limited to a specific logical implementation of routing values R and no-route values N or other indications that a computation is to be performed. According to embodiments, all that is necessary is that computing element 70 recognize from target-tag T that the computing operation of computing element 70 is to be performed. This recognition identifies computing element 70 with the computing element 70 specified by target-tag T.

Figure 13:
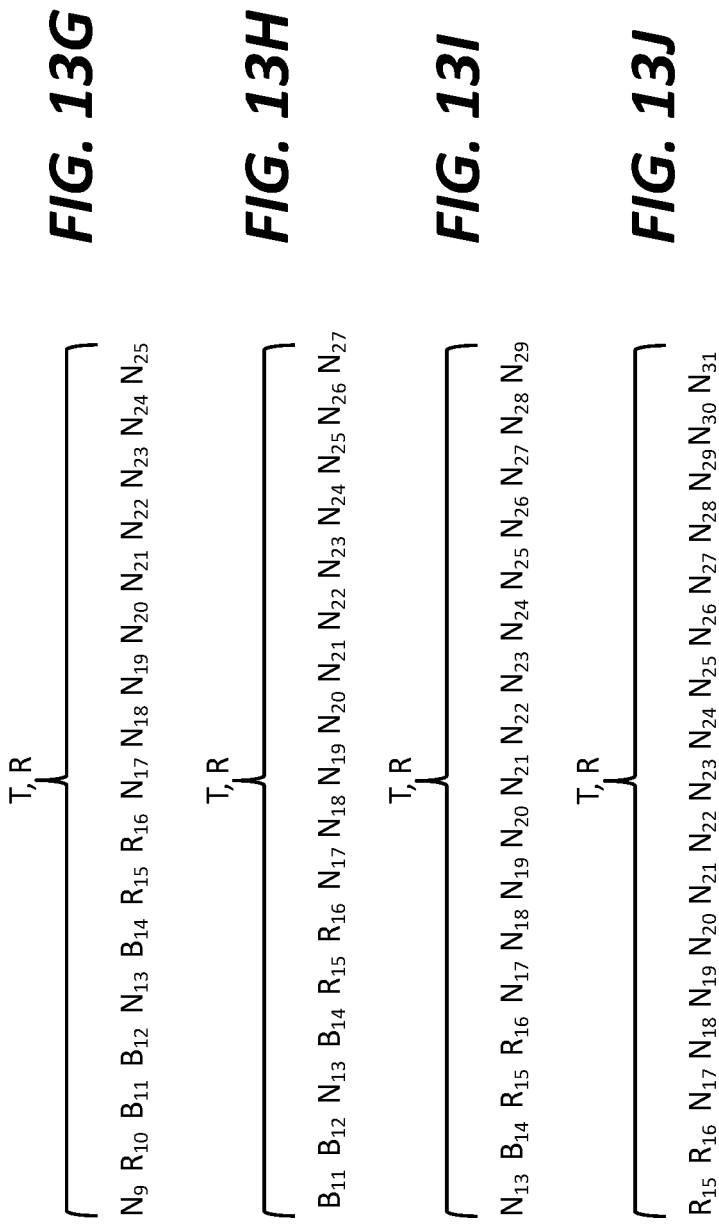
FIGS. 13A-13J are consecutive target-tags for a compute graph performed by the array of computing elements using no-route routing values according to illustrative embodiments of the present disclosure.

As shown in FIG. 13A, the first routing value R is an 'N' and therefore the operation of the first computing element 70 is performed (a multiplication, indicated in FIG. 10 with a '*') and the 'N' routing value R removed from the routing value R list. An arbitrary value (e.g., an 'N' routing value) can be inserted at the bottom of the list. The next routing value R is a 'B' (shown in FIG. 13B) indicating that the result of the multiplication is passed through the bottom connection 48 and the 'B' routing value R removed from the routing value list (shown in FIG. 13C). The next routing value R is also a 'B' (shown in FIG. 13C) indicating that data packet 80 is passed through the bottom connection 48 and the 'B' routing value R removed from the routing value list (shown in FIG. 13D). The next routing value R is an 'N' and therefore the operation of the computing element 70 is performed (an addition, indicated in FIG. 10 with a '+') and the 'N' routing value R removed from the routing value R list. The next routing value R is a 'B' indicating that the result of the addition is passed through the bottom connection 48 and the 'B' routing value R removed from the routing value list (shown in FIG. 13E with both the 'N' and 'B' removed from the routing value R list). The next routing value R is again an 'N' and therefore the operation of the computing element 70 is performed (a transform, indicated in FIG. 10 with a 'f') and the 'N' routing value R removed from the routing value R list. The next routing value R is a 'R' indicating that the result of the addition is passed through the right connection 48 and the 'R' routing value R removed from the routing value list R (shown in FIG. 13F with both the 'N' and 'R' removed from the routing value R list). The next two routing values R are both 'T's, indicating that data packet 80 is passed through top connections 48 and presented to a multiplying compute element 70, and the 'T' routing values R are removed (as shown in FIG. 13G). The next routing value R is again an 'N' and therefore the operation of computing element 70 is performed (a multiplication, indicated in FIG. 10 with a '*') and the 'N' routing value R removed from the routing value R list. The next routing value R is a 'R' indicating that the result of the addition is passed through the right connection 48 and the 'B' routing value R removed from the routing value list (shown in FIG. 13H with both the 'N' and 'R' removed from the routing value R list). The next two routing values R are both 'B's, indicating that data packet 80 is passed through bottom connections 48 and presented to a transform compute element 70, and the 'B' routing values R are removed (as shown in FIG. 13I). The next routing value R is again an 'N' and therefore the operation of computing element 70 is performed (a transform, indicated in FIG. 10 with a 'f') and the 'N' routing value R removed from the routing value R list. The next routing value R is a 'B' indicating that the result of the addition is passed through the bottom connection 48 and the 'B' routing value R removed from the routing value list (shown in FIG. 13J with both the 'N' and 'B' removed from the routing value R list). The next two routing values R are both 'R's, indicating that data packet 80 is passed through right connections 48 and presented to data control circuit 24. Data control circuit 24 detects an 'N' routing value, indicating that data control circuit 24 is to output completed data packet 80. The processing of data packet 80 is then complete and data value D of data packet 80 output from the array of computing elements 70. FIGS. 13A-13J illustrate a list of routing values R in which the active or exposed routing value R is at the front or lowest address location in a memory or register. In some embodiments, he active or exposed routing value R is at the back or highest address location in a memory or register.

Figure 14:
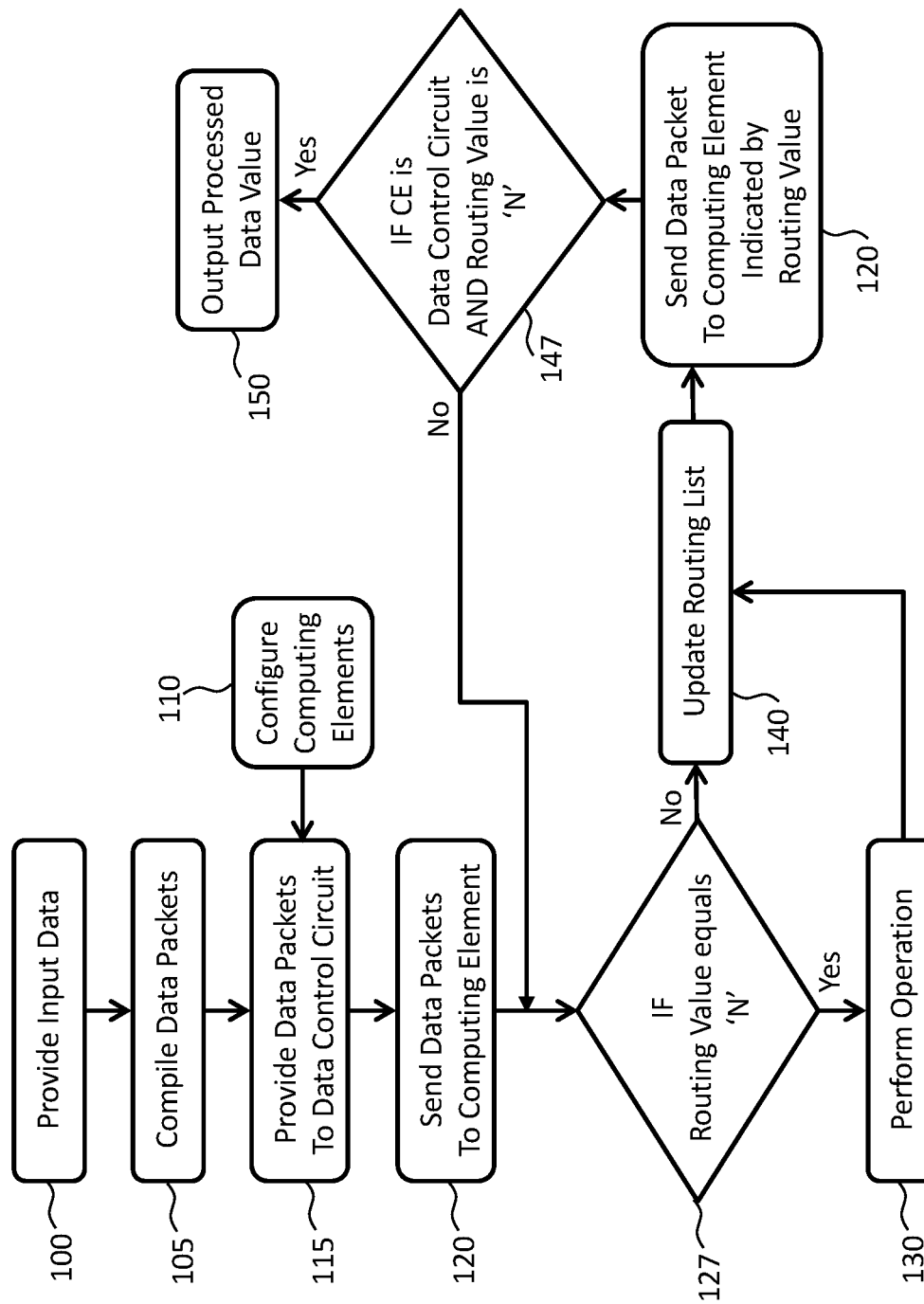
FIG. 14 is a flow diagram illustrating data and computation flow of a compute graph in the array of computing elements corresponding to FIGS. 13A-13M according to illustrative embodiments of the present disclosure.

The overall data flow is illustrated in the flow diagram of FIG. 14 (corresponding to the array of computing elements 70 illustrated in FIG. 7). As shown in FIG. 14, in step 100 input data 40 is provided to the system for example from sensors 30 to hardware system 10 (as shown in FIG. 1). Input data 40 is compiled into data packets 80 in step 105, for example by processor 14. Computing elements 70 are optionally configured (e.g., with configuration values) in step 110 and data packets 80 are transmitted to data control circuit 24 in step 115. Data control circuit 24 then sends data packets 80 into the array of configured computing elements 70 in step 120, for example through input bus 42 (shown in FIG. 4) or connections 48 (as shown in FIG. 7). If the current computing element 70 detects an 'N' routing value R, the operation is performed in step 130. If current computing element 70 does not detect an 'N' routing value R, no operation is performed. Data packet 80 is routed to a neighboring computing element 70 through connection 48 indicated in the routing list in step 145 after updating the routing list in step 140. If receiving computing element 70 is data control circuit 24 and the next routing value R equals an 'N', the compute graph is complete in step 145 and the processed data output in step 150. If the receiving computing element 70 is not data control circuit 24 (or, alternatively, if data control circuit 24 does not detect an 'N' routing value R), the process continues until the processed data is communicated to data control circuit 24. For example, data control circuit 24 can route data from one side of the array to the other in the row in which data control circuit 24 is connected.

Multiple sets of data packets 80 can circulate through the array of computing elements 70 at the same time, as directed by the compiled data packets 80, enabling an efficient use of computing elements 70. Because computing elements 70 can be implemented directly in logic circuits without the need for a stored program machine in each computing element 70, the input, processing operations, and output operations, including communications between one computing element 70 and another computing element 70 through connections 48 can be very fast, for example nanoseconds, resulting in extremely fast and power efficient computing.

Figure 16:
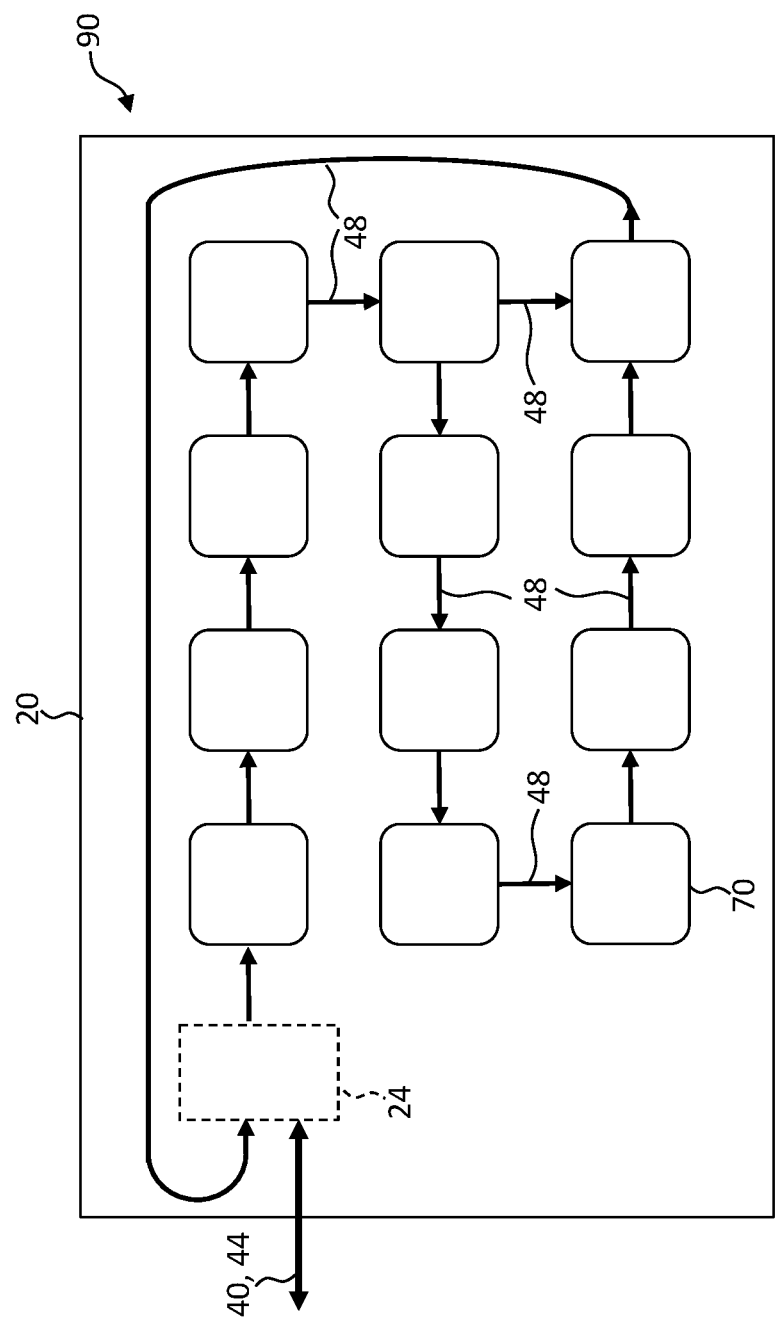
Figure 17:
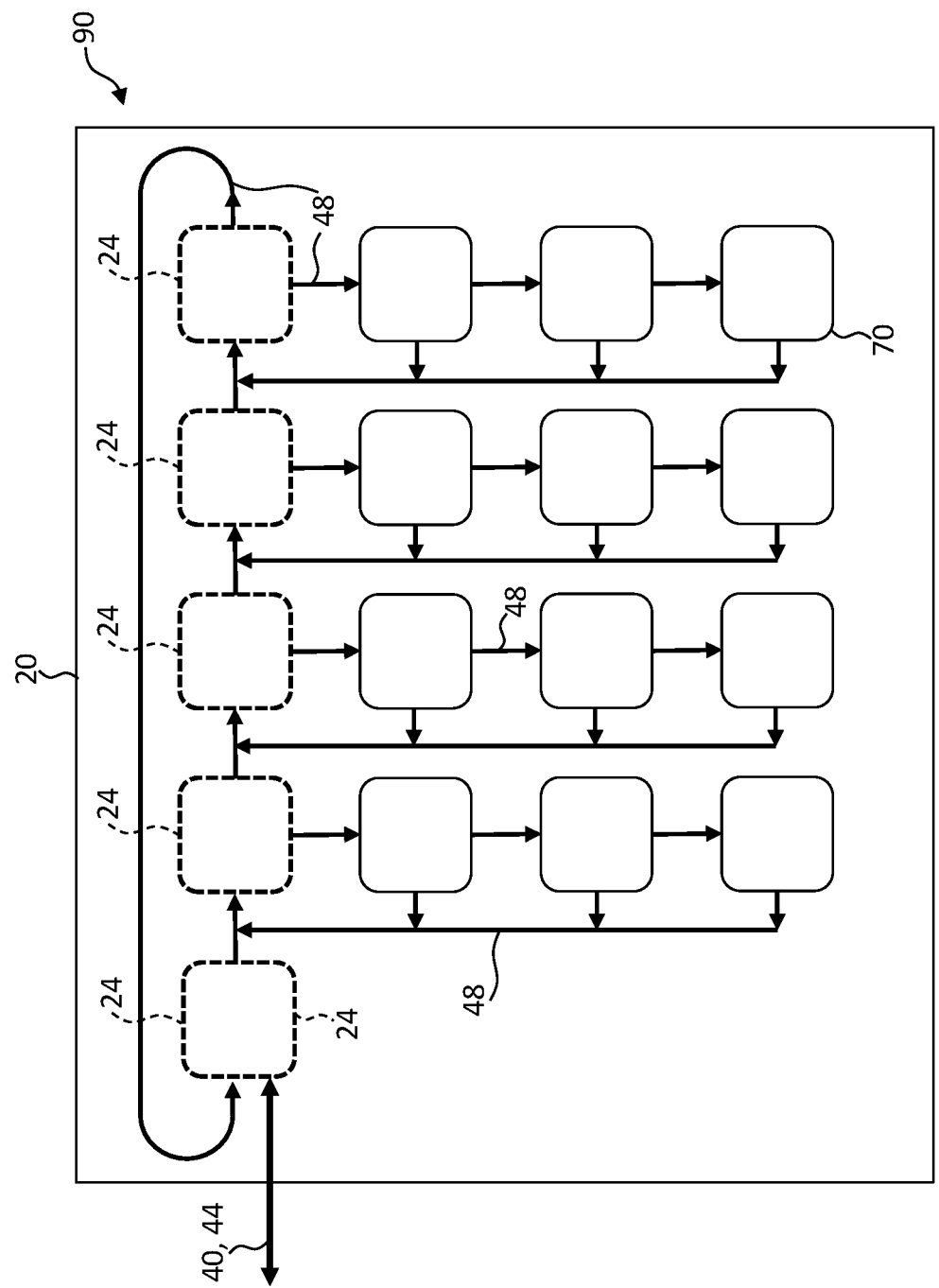
Figure 18:
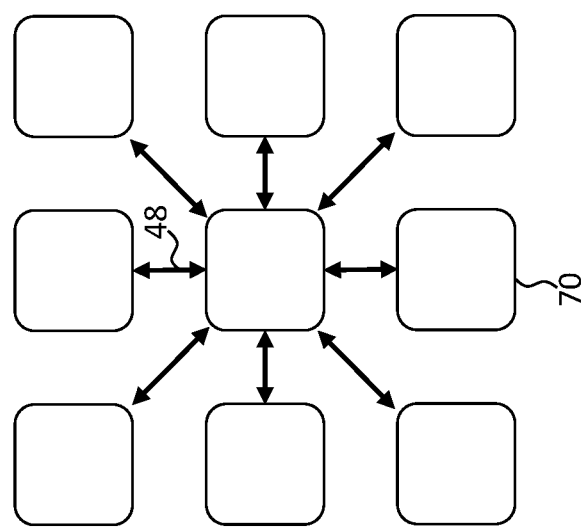

Embodiments of the present disclosure comprise a wide variety of computing element 70 configurations and connection 48 architectures. Likewise, embodiments of the present disclosure comprise a wide variety of computing elements 70, for example a data control circuit 24 that interacts with an external system (e.g., processor 14), computing elements 70 that comprise operation circuits 74, computing elements 70 that serve as memory nodes and can buffer or order data packets 80 (e.g., comprises shift registers or memory arrays such as SRAM and a state machine controller) or routing nodes. FIG. 15 illustrate embodiments comprising uni-directional connections 48 in a grid arrangement with computing elements 70 at opposite corners of the grid connected to data control circuit 24. Such embodiments are simpler and require fewer connections 48 but can require more routing than other arrangements, such as those of FIG. 7. FIG. 16 illustrates a one-dimensional array of simpler computing elements 70 with fewer connections 48. In some embodiments and as illustrated in FIG. 17, multiple data control circuits 24 can each control a subset of the array of computing elements 70. The computing elements 70 in each subset can be a one-dimensional or two-dimensional array and can comprise a variety of functions, for example matrix-vector product multiplier, accumulator, non-linear transformer, and a memory node. In some embodiments, computing elements 70 are connected diagonally by bi-directional (optionally uni-directional) connections 48 to eight nearest-neighbor computing elements 70, as illustrated in FIG. 18. Diagonal connections 48 can reduce the number of routing communication steps. In some such embodiments, routing values R can be stored as a three-bit value. In some configurations, data packets 80 can be routed using different routes to control the data packet 80 time of arrival.

Figure 19:
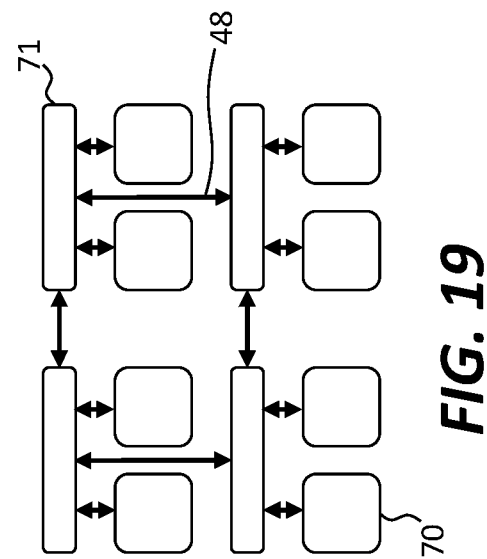

FIG. 19 illustrates embodiments in which relatively simple message-passing circuits 71 are connected with connections 48 and each message-passing circuit 71 can pass data packets 80 to one or more computing elements 70 connected to the message-passing circuit 71. This arrangement can simplify computing elements 70.

In embodiments of the present disclosure, multiple data packets 80 can circulate within the array of computing elements 70. However, when any one or more of computing elements 70 is not computing, routing, or otherwise active, it can enter a reduced-power quiescent state to save power in computing accelerator 20.

According to embodiments of the present disclosure, circuits in computing elements 70 can be integrated circuits comprising digital logic, for example made in a silicon substrate or other semiconductor material using photolithographic processes in a semiconductor foundry and assembled using printed circuit board techniques. Computing elements 70 can be constructed in a single integrated circuit. Computing element array systems, for example computing accelerators 20 can be operated by providing power to the circuits comprising computing accelerators 20 and suitable electrical signals providing input data 40 and target-tags T to computing accelerators 20.

According to embodiments of the present disclosure, a matrix-vector multiplier (MVM) 60 can perform a matrix-vector product operation in a computing element 70 (e.g., as illustrated in FIG. 3) either as a digital operation or with analog operations, or a combination. Such an MVM 60 can comprise digital circuits and logic to perform the operations indicated or can comprise analog circuits, or a combination of digital and analog circuits. Such dot product matrix multiplications are typical operations in neural network computations. In some embodiments, MVM 60 can comprise a multi-bit capacitor array and an analog-to-digital converter 98 that provides a multiply-and-accumulate (MAC) function and forms the basis for improved power efficiency of an in-memory compute architecture of a computing element 70 in a hardware system 10. The multi-bit capacitor array is referenced herein as a qMAC 61 ('q' referencing a charge Q in the multi-bit capacitor array) and can implement a dot-product operation in MVM 60 of a computing element 70. Such a dot product multiplies each member of a one-dimensional vector with N input values to each member of a column with N values in an M×N array and accumulates (sums) the multiplied values, resulting in an output vector with M values. The M×N array can be a weight matrix in a neural network computation. If M equals one, the corresponding elements in each one-dimensional Nx1 array are multiplied and their values added to provide a single value. In some embodiments of the present disclosure, the dot product operation is performed at least partially in the analog domain (e.g., with charges in one or more capacitors) to reduce power and increase the speed of the multiplication, resulting in improved performance and power efficiency.

Figure 20:
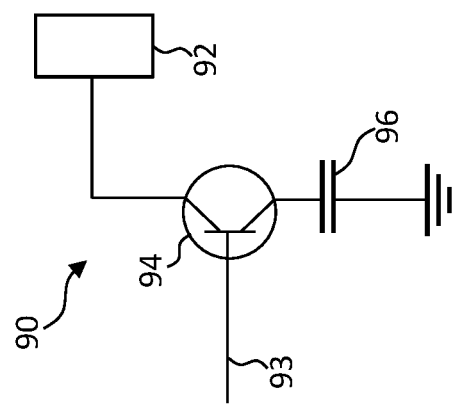
FIG. 20 is a simplified schematic of a unit capacitive multiplier according to illustrative embodiments of the present disclosure.

As illustrated in the embodiments of FIG. 20, a unit capacitive multiplier 90 comprises a latch 92 that stores a value, for example a weight value W. The value stored in latch 92 can be an analog value, for example a voltage stored on a capacitor, or a digital value, for example a binary value stored in a flip-flop or digital latch. A switch 94 (e.g., a transistor) connects latch 92 to a capacitor 96. Switch 94 can be a digital binary switch operable in two states or can be an analog switch providing a continuous control, e.g., for example in response to a voltage in a bipolar transistor. A switch input 93 (e.g., input 40) controls switch 94 to turn switch 94 on and conduct charge from latch 92 to capacitor 96. If latch 92 stores a zero value or if switch input 93 is zero, no charge is conducted. Only if both latch 92 and switch input 93 have a value greater than zero is charge conducted to capacitor 96. In the simplest case, latch 92 and switch 94 are single bits. In some embodiments, latch 92 and switch 94 have voltages representing multiple bits or are continuous voltages that charge capacitor 96 with an effectively continuous charge. The output (charge Q) on capacitor 96 is equivalent to switch input 93 multiplied by latch 92 so that Q=W*X (and corresponding, for example, to the inset of FIG. 3).

Figure 21:
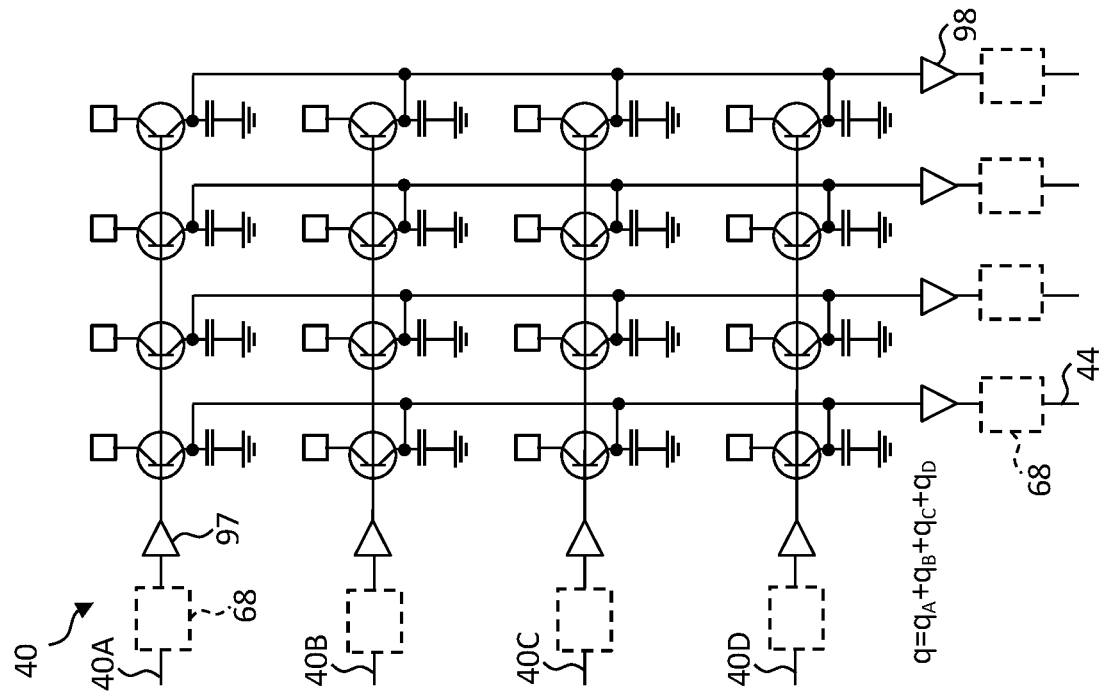
FIG. 21 is a simplified schematic of an array of unit capacitive multipliers according to illustrative embodiments of the present disclosure.

A complete MVM 60 can comprise a plurality of unit capacitive multipliers 90 forming a qMAC 61. The accumulation (sum) of an array of unit capacitive multipliers 90 (e.g., representing a column of multipliers in FIG. 3) is obtained by shorting capacitors 96 together, accumulating all of charges Q, as illustrated in FIG. 21. This accumulation is performed nearly instantaneously (as charges propagate very quickly along a conductor) and requires very little power, thereby saving energy. Inputs 40 (e.g., 40A, 40B, 40C, 40D) can be converted from a digital value to an analog value (e.g., a voltage) with a digital-to-analog converter (as shown in FIG. 3), and the output values can be converted to a digital value from an analog (e.g., charge) value with an analog-to-digital converter. In some embodiments, qMAC 61 is an analog array multiplier. Input data 40 and output data 44 can be transformed from one mathematical space to another (e.g., from linear to non-linear or vice versa) by optional transform circuits 68. The conversion can be specifically chosen to complement the characteristics of switch 94 and latch 92 to enable the multiplication operation.

Figure 22:
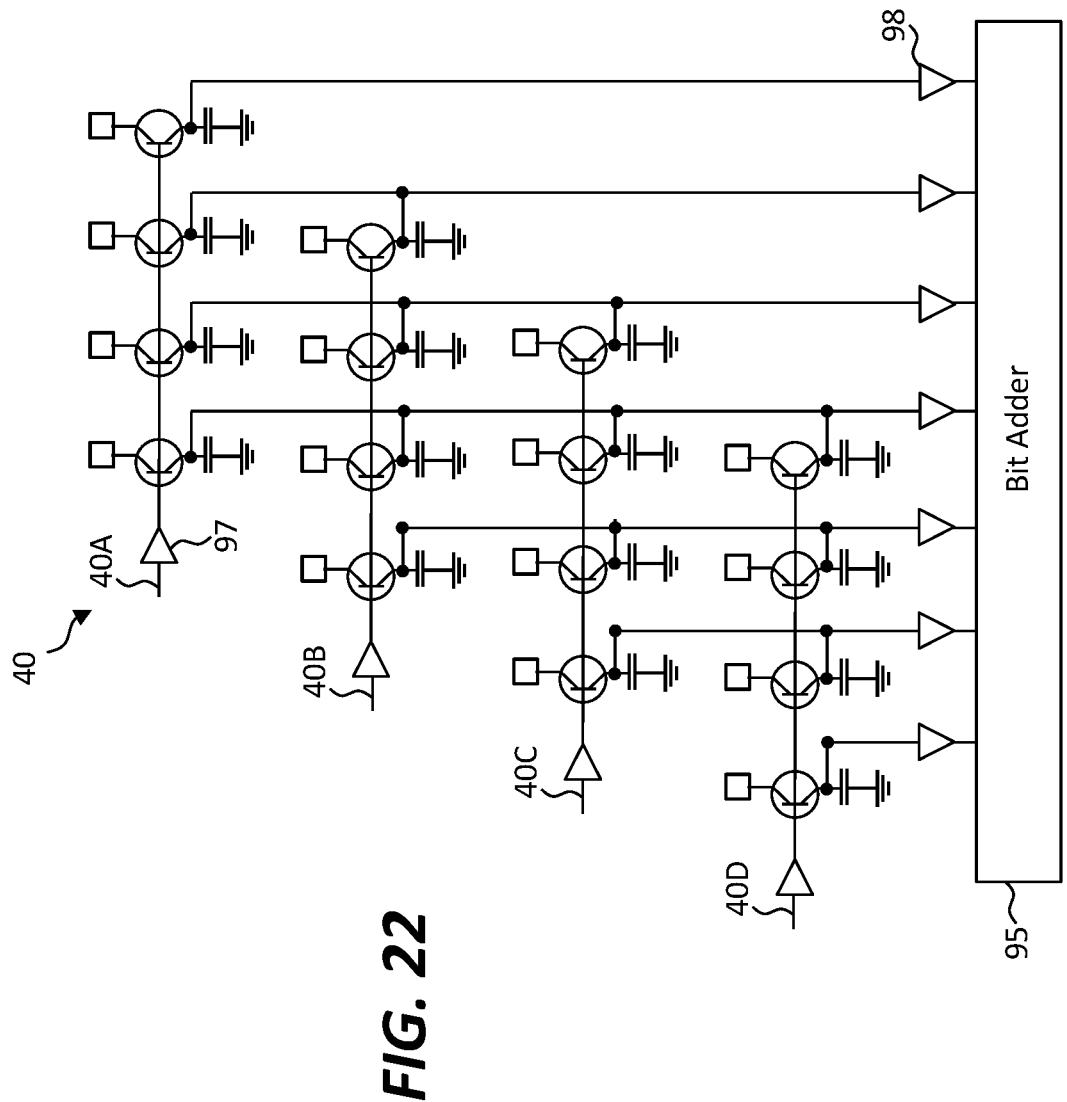
FIG. 22 is a simplified schematic of an array of unit capacitive multipliers arranged to perform a digital multiplication according to illustrative embodiments of the present disclosure.
Figures 23A, 23B, 23C:
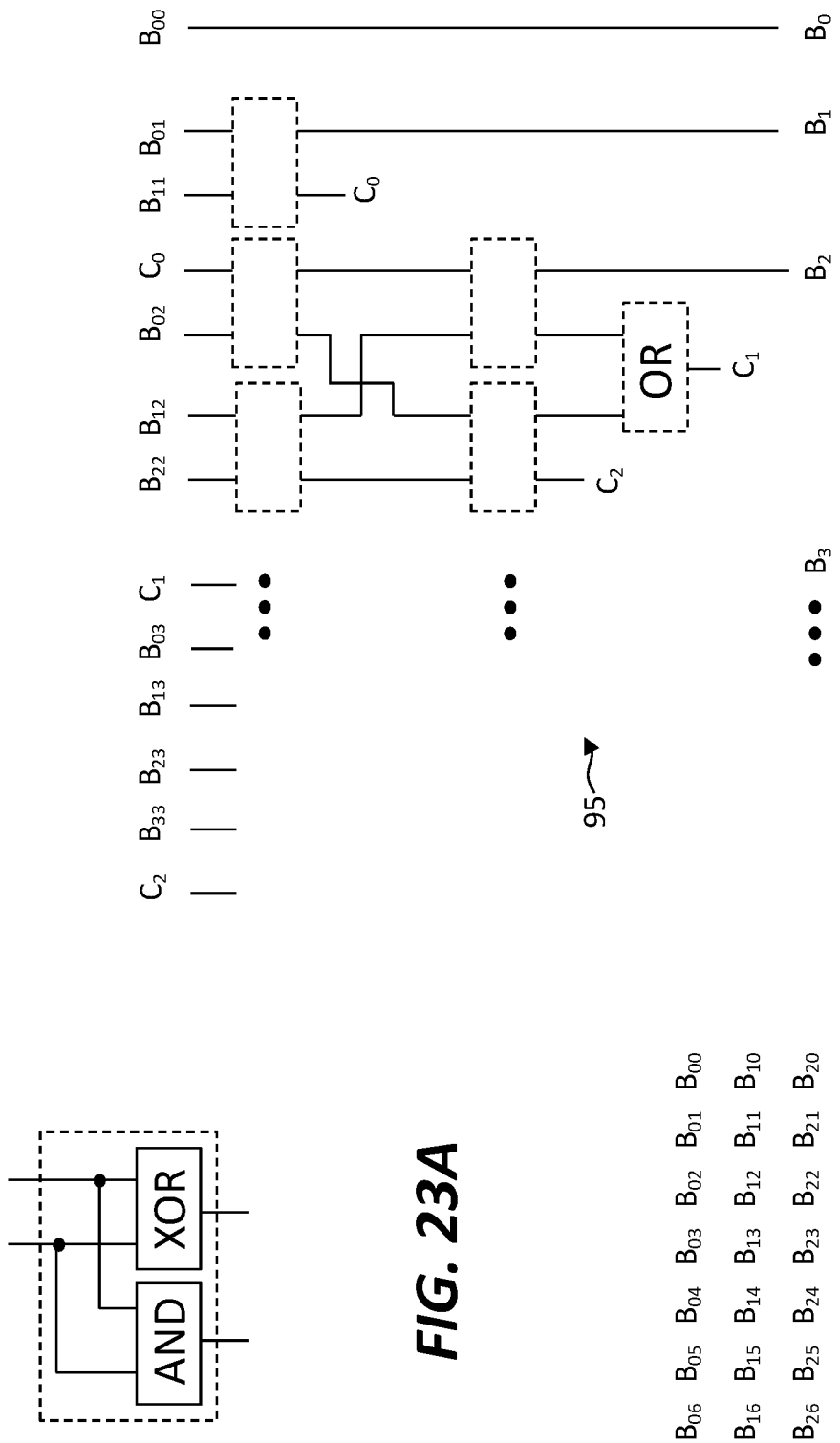
FIG. 23A is a unit logical cell according to illustrative embodiments of the present disclosure.
FIG. 23B is a circuit using unit logical cells to accumulate multiplied single-bit values according to illustrative embodiments of the present disclosure.
FIG. 23C illustrates bit numbering useful in understanding embodiments of the present disclosure.

In some embodiments, each multiplication is performed as a digital operation and each unit multiplication element of FIG. 21 is a digital multiplier, for example as illustrated in FIG. 22. In some such embodiments, latch 92 stores a binary value, switch input 93 is a binary value, and switch 94 is a binary switch. When both latch 92 and switch input 93 are high (a positive voltage, TRUE value, or one value), charge is deposited on capacitor 96. The charge for each bit of the product is summed, for example with capacitor 96. The bits for the resulting digital value can be accumulated, for example with a digital circuit and as shown in FIGS. 23A and 23B, where the bits are labeled $B_{yx}$ where y is the row and x is the bit in the row of the unit multipliers of FIG. 22, assuming a square matrix with the missing unit multipliers also labeled, as shown in FIG. 23C. FIG. 23A shows a logical exclusive OR (XOR) function and a logical AND function used repeatedly in FIG. 23B (together with an OR function) to accumulate each of the lowest three bits of the multiplication. Those knowledgeable in digital logic design can use similar or the same concepts to design a logical circuit to compute the bit values for a digital multiplication with an arbitrary number of bits. In some embodiments, the capacitor in FIG. 20 and in FIG. 21 can be replaced with a high-value resistor and the output of each unit multiplier fed as a voltage (either pulled to ground by the resistor as a zero value if latch 92 or switch 94 are low (have a low voltage) or pulled up if both are high (have a high voltage) as a one value) directly into the circuit of FIG. 23B without performing a capacitive summing or any analog-to-digital or digital-to-analog conversion.

According to embodiments of the present disclosure, the use of a digital one-bit multiplier as illustrated in FIG. 20 provides advantages over using a conventional digital logic AND gate. Such an embodiment can be operated in a lower-voltage regime for switch 94 (e.g., a transistor) with reduced leakage in comparison to a digital gate or logic circuit, thereby reducing power used. Since unit multiplier 90 is used repeatedly at high speeds and frequencies, such a power reduction can significantly reduce the power used by MVM 60. For example, a four-by-four array of multipliers as shown in FIG. 21 using the digital multiplier structure of FIG. 22 will require a four-by-four array of unit multipliers 90 to perform each multiplication or 256 (16×16) multipliers. Since the number of bits is typically much larger than four, the number of unit multipliers is correspondingly large as is the power savings provided by embodiments of the present disclosure. For example, eight-bit values will require 4096 (64×64) multipliers, 16-bit values will require 65536 (256×256) multipliers, and 32-bit values will require 1048576 (1024×1024) multipliers.

According to embodiments of the present disclosure, MVM 60 can compute only the higher bits of the multiplication between the input vector (e.g., input data 40) and a weight matrix. Since neural nets can respond only very weakly to very small changes in input data, the lower bits of the matrix-vector multiplication can be ignored. Thus, the lower bits of the computation as illustrated in FIG. 22 can be ignored, reducing the size and the power of the circuits used to perform the multiplication.

In some embodiments of the present disclosure, only a subset of accumulated values or vectors are processed. In a network in which matrices are repeatedly processed, by pruning or otherwise downsampling the results from one or more vector product multiplications (e.g., choosing a subset less than all of the accumulated values or vectors), the total number of computations and energy used is reduced. In some embodiments, results that are zero or relatively small compared to other accumulated values or vectors are set to zero or dismissed from subsequent calculations.

Having described certain implementations of embodiments, it will now become apparent to one of skill in the art that other implementations incorporating the concepts of the disclosure may be used. Therefore, the disclosure should not be limited to certain implementations, but rather should be limited only by the spirit and scope of the following claims.

Throughout the description, where apparatus and systems are described as having, including, or comprising specific elements, or where processes and methods are described as having, including, or comprising specific steps, it is contemplated that, additionally, there are apparatus and systems of the disclosed technology that consist essentially of, or consist of, the recited elements, and that there are processes and methods according to the disclosed technology that consist essentially of, or consist of, the recited processing steps.

It should be understood that the order of steps or order for performing certain action is immaterial so long as the disclosed technology remains operable. Moreover, two or more steps or actions in some circumstances can be conducted simultaneously. The disclosure has been described in detail with particular reference to certain embodiments thereof, but it will be understood that variations and modifications can be effected within the spirit and scope of the following claims.

PARTS LIST

B bit
C computing element identifier/identifier
D data value
E end-tag
k constant
N no-route
O operation
Q charge
R routing value
S self-tag
T target-tag
W weight value
10 hardware system
12 memory
14 processor
20 computing accelerator
22 interrupt signal
24 data control circuit
26 input control circuit
28 output control circuit
30, 30A, 30B, 30C sensor
32 sensor signal
40, 40A, 40B, 40C, 40D, 40N input/input data/input value
42 input bus
44 output/output data
46 output bus
48 connection
50 sensor interface circuit
52 general-purpose input/output circuit
54 automatic gain circuit
56 internal logic and clock gating
60 in-memory matrix multiplier
61 qMAC
62 non-linearity transformer
64 accumulator
66 memory node
68 transform circuit
70 computing element
72 storage circuit
74 operation circuit
78 control circuit/computing element control circuit
80 data packet
90 unit capacitive multiplier/unit multiplier
92 latch
93 switch input
94 switch
95 bit adder
96 capacitor
97 digital-to-analog converter
98 analog-to-digital converter
100 provide input data step
105 compile data packets step
110 configure computing elements step
115 provide data packets to data control circuit step
120 send data packets to computing element step
125 if exposed operation matches computing element step
127 if exposed routing value matches no-route step
130 perform operation step
135 update operation list step
140 update routing list step
145 if computing element matches data control circuit step
147 if computing element is data control circuit AND routing value is N step
150 output processed data value step

What is claimed:

1. A computing element array system, comprising:
an array of computing elements connected by connections, wherein each computing element comprises a control circuit, a storage circuit, and an operation circuit, and
wherein the connections each connect two computing elements, and
wherein for each computing element in the array of computing elements,
the storage circuit is operable to input a data packet comprising a data value and a target-tag from one of the connections and to store the data packet,
the operation circuit is operable to perform an operation on the data value to form a processed data value, the target-tag specifies a computing element to perform the operation on the data value, and the control circuit is operable to identify the computing element with the computing element specified by the target-tag, enable the operation circuit to process the data value if the computing element identified by the target-tag is the computing element, modify the data packet to comprise the processed data value, and enable the output of the modified data packet on one of the connections, wherein the array is a two-dimensional grid, a three-dimensional grid, a three-dimensional array, a torus, or a ring with one or more uni-directional connections, the target-tag comprises one or more routing values disposed in a routing value ordered list, and the control circuit is operable to modify the routing values in the routing value ordered list.

2. The computing element array system of claim 1, wherein the computing element comprises a self-tag describing the computing element, wherein the target-tag comprises one or more computing element specifications, and wherein the control circuit identifies the computing element by comparing the computing element specification in the target-tag with the self-tag.

3. The computing element array system of claim 1, wherein the control circuit is operable to modify the target-tag to provide an end-tag to a computing element ordered list.

4. The computing element array system of claim 1, wherein the target-tag specifies multiple computing elements to sequentially perform operations on the data value.

5. The computing element array system of claim 1, comprising a data control circuit connected to one or more computing elements in the array of computing elements, wherein the data control circuit is operable to receive data packets from outside the array of computing elements and transmit data packets out of the array of computing elements.

6. The computing element array system of claim 1, wherein the computing element is (i) a routing node, (ii) a memory node, (iii) operable to perform a routing pass-through, (iv) operable to store one or more data values for a specified period, or (v) any combination of (i)-(iv).

7. The computing element array system of claim 1, wherein the operation circuit of a first computing element is operable to perform a first operation and the operation circuit of a second computing element is operable to perform a second operation different from the first operation.

8. The computing element array system of claim 1, wherein two or more of the computing elements are synchronous.

9. The computing element array system of claim 1, wherein two or more of the computing elements are asynchronous.

10. The computing element array system of claim 1, wherein the storage circuit of one or more of the computing elements is operable to receive input data from two neighboring computing elements, is operable to output data to one or two neighboring computing elements, or both.

11. The computing element array system of claim 1, wherein the target-tag specifies a mathematical function or a compute graph.

12. A computing element array, comprising:
an array of computing elements connected by connections, wherein each computing element comprises a control circuit, a storage circuit, and an operation circuit, and each computing element is operable to store a self-tag that identifies an operation performed by the operation circuit, and wherein for each computing element in the array of computing elements,
the storage circuit is operable to receive a data packet from one of the connections and store the data packet,
the data packet comprises a data value and a target-tag specifying an operation to be performed on the data value,
the control circuit is operable to compare the target-tag to the self-tag, enable the operation circuit to process the data value if the self-tag matches the target-tag, modify the data packet to comprise the processed data value, and enable the output of the modified data packet on one of the connections, and
the operation circuit is operable to process the data value to form a processed data value,
wherein the array is a three-dimensional grid, a three-dimensional array a torus, or a ring with one or more uni-directional connections.

13. A computing element array, comprising:
an array of computing elements connected by connections, wherein each computing element comprises a control circuit, a storage circuit, and an operation circuit, and wherein for each computing element in the array of computing elements,
the storage circuit is operable to receive a data packet from one of the connections and store the data packet,
the data packet comprises a data value and a target-tag specifying routing values, wherein one of the routing values is a no-route value indicating that the operation circuit operates on the data value,
the control circuit is operable to identify the no-route value, enable the operation circuit to process the data value if the no-route value is identified, modify the data packet to comprise the processed data value, and enable the output of the modified data packet on one of the connections, and
the operation circuit is operable to process the data value to form a processed data value,
wherein the array is a three-dimensional grid, a three-dimensional array, a torus, or a ring with uni-directional connections.

14. The computing element array system of claim 5, wherein the data control circuit is connected to computing elements at opposite corners of the grid connected to the data control circuit.

15. The computing element array system of claim 1, wherein the computing elements are not all identical and have different operation circuits.

16. A computing element array system, comprising:
an array of computing elements connected by connections, wherein each computing element comprises a control circuit, a storage circuit, and an operation circuit, and wherein the connections each connect two computing elements, and wherein for each computing element in the array of computing elements,
the storage circuit is operable to input a data packet comprising a data value and a target-tag from one of the connections and to store the data packet, the operation circuit is operable to perform an operation on the data value to form a processed data value, the target-tag specifies a computing element to perform the operation on the data value, and the control circuit is operable to identify the computing element with the computing element specified by the target-tag, enable the operation circuit to process the data value if the computing element identified by the target-tag is the computing element, modify the data packet to comprise the processed data value, and enable the output of the modified data packet on one of the connections, wherein the computing elements are not all identical and have different operation circuits.

17. The computing element array system of claim 1, wherein the control circuit is operable to remove a routing value from the routing value ordered list or wherein the routing value ordered list comprises a routing value list pointer and the control circuit is operable to change the routing value list pointer.

* * * * *